United States Patent
Gutierrez

(10) Patent No.: US 11,136,077 B2
(45) Date of Patent: Oct. 5, 2021

(54) ADJUSTABLE SPARE TIRE CARRIER

(71) Applicant: Lund Motion Products, Inc., Buford, GA (US)

(72) Inventor: Carlos Gutierrez, Norwalk, CA (US)

(73) Assignee: Lund Motion Products, Inc., Buford, GA (US)

( * ) Notice: Subject to any disclaimer, the term of this patent is extended or adjusted under 35 U.S.C. 154(b) by 59 days.

(21) Appl. No.: 15/793,402

(22) Filed: Oct. 25, 2017

(65) Prior Publication Data

US 2018/0118283 A1     May 3, 2018

Related U.S. Application Data

(60) Provisional application No. 62/413,827, filed on Oct. 27, 2016.

(51) Int. Cl.
*B62D 43/02* (2006.01)
*B60P 7/135* (2006.01)

(52) U.S. Cl.
CPC ............. *B62D 43/02* (2013.01); *B60P 7/135* (2013.01)

(58) Field of Classification Search
CPC ....... B60P 7/135; B62D 43/02; B62D 43/002; B62D 43/00; B62D 1/52; B60R 9/06; B60R 9/00
USPC ........... 224/42.24, 42.27, 42.3, 42.29, 42.26, 224/42.21, 489, 509
See application file for complete search history.

(56) References Cited

U.S. PATENT DOCUMENTS

| | | | | |
|---|---|---|---|---|
| 2,805,807 A | * | 9/1957 | Slack | B62D 43/02 224/42.21 |
| 3,326,434 A | * | 6/1967 | Cheadle | B62D 43/02 224/42.21 |
| 3,669,326 A | * | 6/1972 | Podraza | B62D 43/02 224/42.21 |
| 4,140,255 A | * | 2/1979 | Weiler | B62D 43/02 224/42.21 |
| 4,561,575 A | | 12/1985 | Jones | |
| 4,718,582 A | | 1/1988 | Iovenitti | |
| 4,817,834 A | | 4/1989 | Weiler | |
| 5,104,015 A | | 4/1992 | Johnson | |
| 5,370,285 A | | 12/1994 | Steelman | |
| 5,806,736 A | | 9/1998 | Kincart | |
| 6,659,318 B2 | * | 12/2003 | Newbill | B60R 9/06 224/282 |
| 6,796,466 B2 | | 9/2004 | Essig | |
| 6,923,351 B2 | | 8/2005 | Roehmer et al. | |
| 7,021,685 B2 | | 4/2006 | Newbill | |
| 7,861,902 B2 | | 1/2011 | Osenkowski | |

(Continued)

FOREIGN PATENT DOCUMENTS

DE     2946449 A1 *  5/1981   ............. B62D 43/02

OTHER PUBLICATIONS

Translation of DE 2946449 A1.*

*Primary Examiner* — Nathan J Newhouse
*Assistant Examiner* — Matthew T Theis
(74) *Attorney, Agent, or Firm* — Knobbe Martens Olson & Bear, LLP

(57) ABSTRACT

Disclosed herein are embodiments of a spare tire carrier for a vehicle that can be adjustable for moving the spare tire into different positions. The spare tire carrier can be attached to existing components of a vehicle in order to move the spare tire's position, which can be advantageous for avoiding environmental hazards when off-roading.

14 Claims, 26 Drawing Sheets

(56) References Cited

U.S. PATENT DOCUMENTS

| | | | |
|---|---|---|---|
| 8,251,265 B2 * | 8/2012 | Grudek | ................... B62J 11/00 224/42.12 |
| 8,540,125 B2 | 9/2013 | Newbill | |
| 10,370,044 B2 | 8/2019 | Cherry et al. | |
| 10,661,845 B2 | 5/2020 | Wymore | |
| 10,858,050 B2 | 12/2020 | Headlee | |
| 2019/0126840 A1 | 5/2019 | Grossaint | |
| 2019/0351955 A1 | 11/2019 | Headlee | |

* cited by examiner

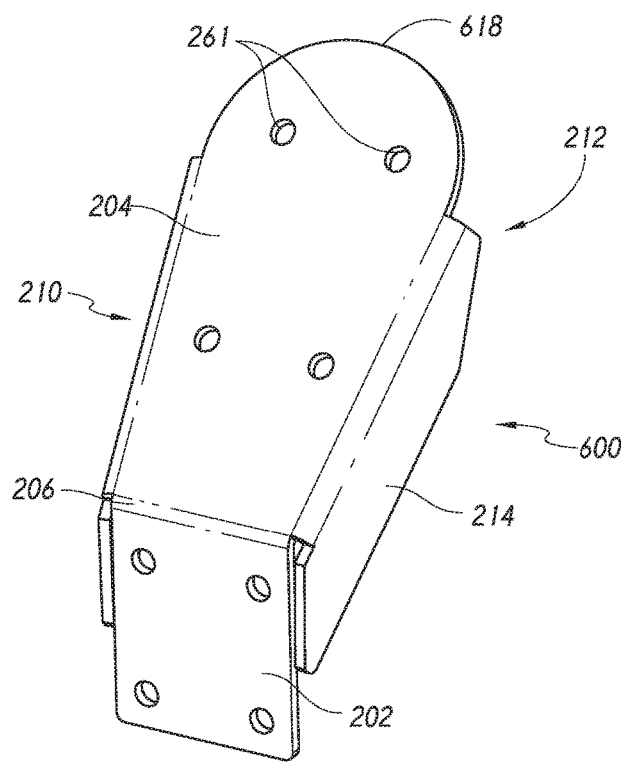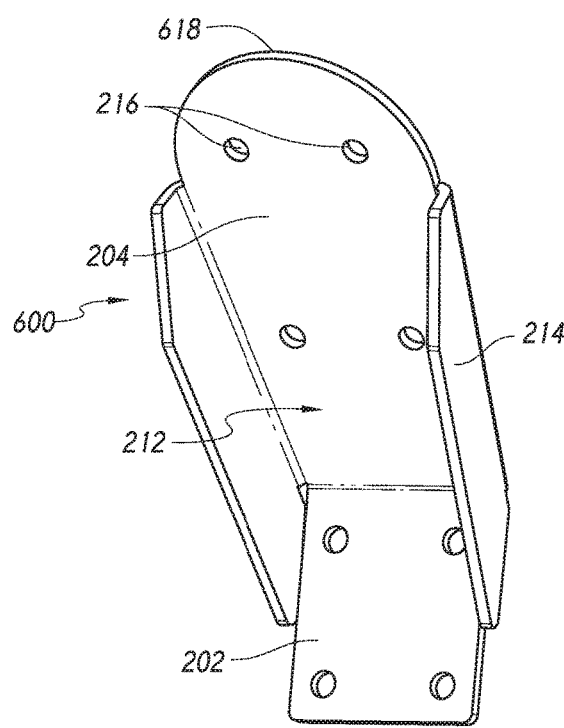
FIG. 16A FIG. 16B
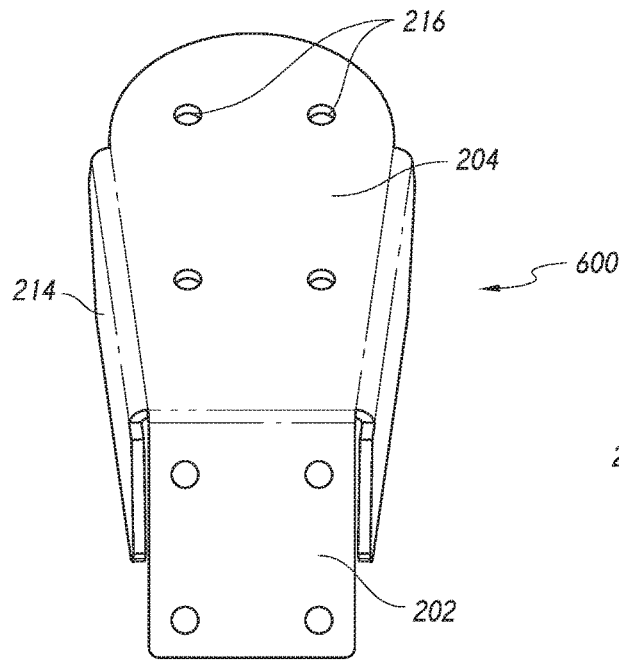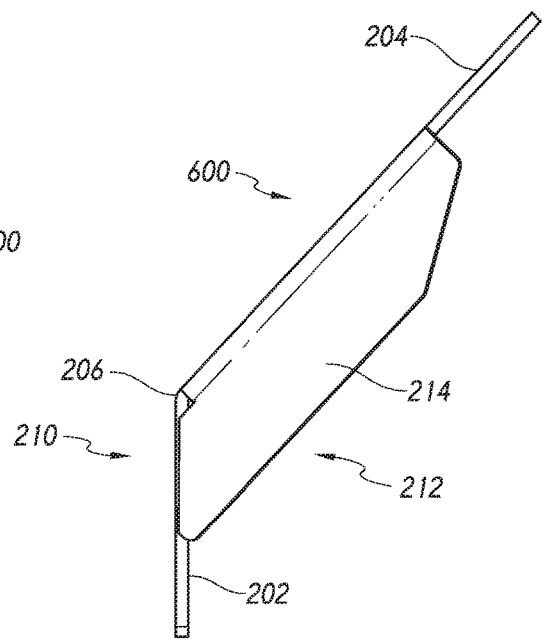
FIG. 16C FIG. 16D

ADJUSTABLE SPARE TIRE CARRIER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This disclosure relates generally to spare tire carriers.

Description of the Related Art

Many vehicles, such as JEEP® and vans, include external spare tire carriers for mounting of a spare tire. Typically, the spare tires are mounted on the rear of a vehicle, such as directly onto the rear of the vehicle body or onto a mounting component extending from the rear of the vehicle. However, the typical mounting being performed only allows the spare tire to be mounted in a single position, typically in a vertical position. Because the spare tire is mounted in a vertical position, when a vehicle is traversing difficult terrain, the spare tire can be impacted causing damage to the vehicle and/or tire and preventing motion of the vehicle.

SUMMARY

Disclosed herein are embodiments of an adjustable spare tire carrier for a vehicle comprising a first leg having a first plurality of apertures and configured to attach to a vehicle, and a second leg connected with the first leg and having a second plurality of apertures, each of the first leg and the second leg being defined by a rearward facing surface and a frontward facing surface, and at least one of the first leg and the second leg having a plurality of sidewalls connecting the rearward facing surface with the frontward facing surface, wherein the first leg and the second leg are both configured to attach to a spare tire or an extender.

In some embodiments, the extender can be attached to the adjustable spare tire carrier, the extender comprising a pair of plates connected by a beam. In some embodiments, the beam can comprise an internal beam and an external beam, the internal beam and external beam configured to slide with respect to one another for adjusting the distance between the pair of plates. In some embodiments, the adjustable spare tire carrier can be at least partially hollow. In some embodiments, the first plurality of apertures and the second plurality of apertures can be configured to receive and retain bolts.

In some embodiments, the first leg and the second leg can be connected at an angle. In some embodiments, the first leg and the second leg can be connected on a straight plane. In some embodiments, the first leg can be configured to be attached to a spare tire mount of the vehicle. In some embodiments, the adjustable spare tire carrier can comprise a cutout section for conforming to a portion of the vehicle or the spare tire mount.

In some embodiments, the adjustable spare tire carrier can be rectangular. In some embodiments, the adjustable spare tire carrier can be tubular. In some embodiments, the first leg and the second leg can have the same dimensions.

Also disclosed herein are embodiments of a vehicle comprising a bumper, a spare tire mount, the spare tire mount comprising a rotatable tube rotatably attached to the bumper and a mounting frame attached to the rotatable tube, and an adjustable spare tire carrier removably attached to the spare tire mount, the adjustable spare tire carrier comprising a first leg having a first plurality of apertures and configured to removably attach to the mounting frame, and a second leg connected with the first leg and having a second plurality of apertures, each of the first leg and the second leg being defined by a rearward facing surface and a frontward facing surface, and at least one of the first leg and the second leg having a plurality of sidewalls connecting the rearward facing surface with the frontward facing surface, wherein the first leg and the second leg are both configured to attach to a spare tire or an extender.

In some embodiments, the first leg and the second leg are connected at an angle. In some embodiments, the first leg and the second leg are connected on a straight plane. In some embodiments, the vehicle can further comprise the extender attached to the adjustable spare tire carrier.

In some embodiments, the spare tire mount can further comprise an attachment surface on the mounting frame configured for the adjustable spare tire carrier to attach to. In some embodiments, the adjustable spare tire carrier can be attached to a rearward facing surface of the attachment surface. In some embodiments, the adjustable spare tire carrier can be attached to a frontward facing surface of the attachment surface.

BRIEF DESCRIPTION OF THE DRAWINGS

FIGS. 16A-D illustrate an embodiment of an alternate angled adjustable spare tire carrier.

DETAILED DESCRIPTION

Disclosed herein are embodiments of an adjustable spare tire carrier that can be used with vehicles. This allows for the spare tire to be moved into different positions on the carrier, and the vehicle can easily drive regardless of the position of the spare tire on the carrier. This can allow the spare tire to be maneuvered out of the way when the vehicle is traversing difficult terrain. Typically, spare tire carriers are locked at only horizontal or only at a particular angle, and cannot be moved, but the disclosed spare tire carrier can allow the spare tire be moved to different angles, for example a vertical and an angled position. Moving the spare tire to different angles can alleviate weight from the tailgate.

Embodiments of the disclosed spare tire carrier can be attached to an existing vehicle. In some embodiments, it can be attached to the bumper of a vehicle. In some embodiments, it can be attached to an existing mount of a spare tire carrier, such as discussed herein.

The spare tire carrier can be formed from any number of materials, such as metal, plastic, or ceramic, and the particular material does not limit the disclosure. Further, embodiments of the spare tire carrier can be made up of multiple different materials.

Advantageously, embodiments of the adjustable spare tire carrier can facilitate adjustment of the orientation of the spare tire on the rear of the vehicle, optimizing the position of the tire for different situations. This can allow for flexibility in maneuvering and preventing damage of the spare tire and/or vehicle. Further, the vehicle can be drivable regardless of the position of the spire tire carrier.

Angled Adjustable Spare Tire Carrier

FIGS. 1-12 illustrate embodiments of an adjustable spare tire carrier (or bracket) with an angled configuration.

Figure 1:
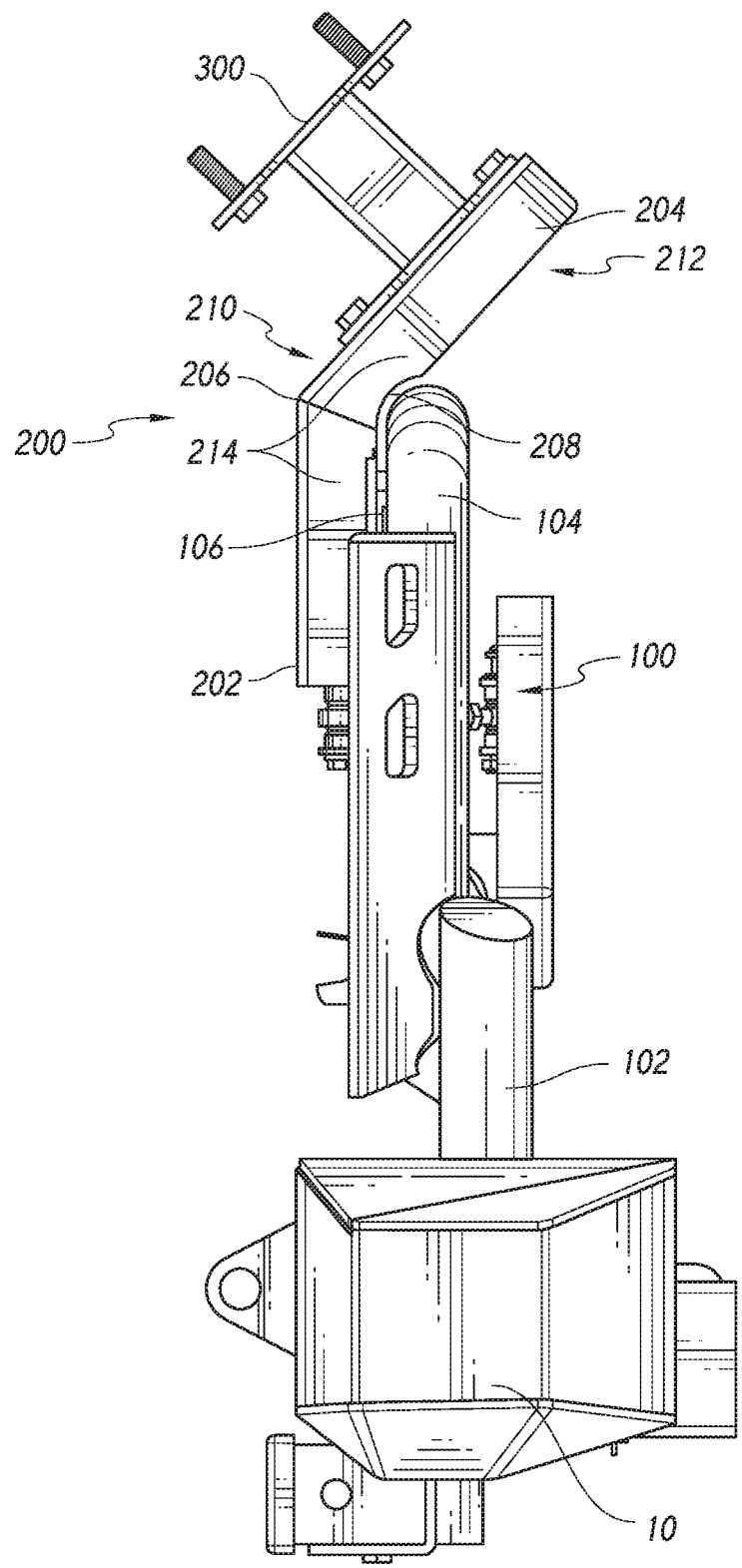
FIG. 1 illustrates an embodiment of an angled adjustable spare tire carrier on a vehicle.

As shown in FIG. 1, the angled adjustable spare tire carrier (or bracket) 200 can be attached to an spare tire mount 100, which can in turn be attached to a vehicle bumper 10. The spare tire mount 100 may be an existing spare tire mount, or may be a unique design as discussed herein. The angled adjustable spare tire carrier 200 may be attached to the spare tire mount 100 through screws, bolts, glues, adhesives, or other attachment mechanisms and the attachment does not limit the disclosure. The angled adjustable spare tire carrier 200 can be removably attached to both the spare tire mount 100 and a spare tire. Further, an extender 300 can be used with the angled adjustable spare tire carrier 200, but may not be used in some embodiments.

In some embodiments, the angled adjustable spare tire carrier 200 may be attached generally centrally on the spare tire mount 100 so as to not place any undue torque or other forces on the spare tire mount 100 or the bumper 10. In some embodiments, the angled adjustable spare tire carrier 200 can be attached offset a central axis of the bumper 101 (e.g., towards one of the ends of the bumper) or the spare tire mount 100. In some embodiments, the spare tire mount 100 can be configured to rotate around an axis on the bumper 10, such as discussed below.

In some embodiments, the angled adjustable spare tire carrier 200 can be directly attached to the vehicle bumper 10, and no existing spare tire mount 100 may be used. In some embodiments, the angled adjustable spare tire carrier 200 can be attached to different extensions of a vehicle, and the particular placement of the angled adjustable spare tire carrier 200 does not limit the disclosure.

The angled adjustable spare tire carrier 200 can have a rearward facing surface 210, a forward facing surface 212, and a plurality of sidewalls 214 extending between the rearward facing surface 210 and the forward facing surface 212. The rearward facing surface 210 can be the surface which attaches to a spare tire or to an extender 300. The frontward facing surface 212 can be the surface which attaches to the vehicle, such as the spare tire mount 100.

In some embodiments, the angled adjustable spare tire carrier 200 may be solid throughout. Therefore, the space between opposite sidewalls 214 is filled in. In some embodiments, the angled adjustable spare tire carrier 200 may be hollow. Therefore, there may be spaces between opposite sidewalls 214.

As shown in FIG. 1, the angled adjustable spare tire carrier 200 can include a first leg 202 and a second leg 204, wherein the first leg 202 and second leg 204 can be attached to one another to form an inner angle 206 (acute angle as shown in FIG. 1, but not limited to an acute angle). In some embodiments, the first and second leg 202/204 can be integrally formed. In some embodiments, the first and second leg 202/204 can be attached to one another, such as through the use of mechanical or chemical (e.g., adhesive) attachment mechanisms. In some embodiments, the first and second leg 202/204 can have a hinged connection to move from an angled configuration discussed here, to a straight configuration discussed below. A spare tire can be attached to either the first leg 202 or the second leg 204, allowing for a user to change the position as desired. Further details are discussed below.

Each leg 202/204 can have a forward facing surface 212 (e.g., facing towards the front of a vehicle) and a rearward facing surface 210. A spare tire can be attached to the rearward facing surface 210 of either leg 202/204. Further, the angled adjustable spare tire carrier 200 can attach to a vehicle on the frontward facing surface 212 of the first leg 202.

The first and second leg 202/204 can be attached to form a particular angle between the legs 202/204. In some embodiments, the angle can be sharp. In some embodiments, the angle may be curved. The angle can be 10, 15, 20, 25, 30, 35, 40, 45, 50, 55, 60, 65, or 70° (or about 10, about 15, about 20, about 25, about 30, about 35, about 40, about 45, about 50, about 55, about 60, about 65, or about 70°). In embodiments, the angle may be within a range formed by selecting any two numbers (two angles) listed in the immediately previous sentence, e.g., between about 10° and about 70°, between about 20° and about 45°, or between 35° and 45°. In some embodiments, the angle can be greater than 10, 15, 20, 25, 30, 35, 40, 45, 50, 55, 60, 65, or 70° (or greater than about 10, about 15, about 20, about 25, about 30, about 35, about 40, about 45, about 50, about 55, about 60, about 65, or about 70°). In some embodiments, the angle can be less than 10, 15, 20, 25, 30, 35, 40, 45, 50, 55, 60, 65, or 70° (or about 10, about 15, about 20, about 25, about 30, about 35, about 40, about 45, about 50, about 55, about 60, about 65, or about 70°).

Additionally, the angled adjustable spare tire carrier 200 can further include a cutout 208 on its frontward facing surface 212 in some embodiments, wherein the cutout 208 can be shaped to conform to a portion of the spare tire mount 100. The cutout 208 can be rounded as shown in FIG. 1. Different angled adjustable spare tire carrier 200 can have different cutouts 208 to match with different configurations for attachment. In some embodiments, the angled adjustable spare tire carrier 200 may not have a cutout 208. In some embodiments, the cutout 208 may contain a softer material, such as a plastic or rubber, to provide further cushioning and support against the spare tire mount 100.

Further, as shown only the first leg 202 may be attached to the spare tire mount 100. Thus, the second leg 204 may not be attached to the spare tire mount 100. In some embodiments, the second leg 204 may have mounting features for attachment to the spare tire mount 100.

As shown in FIG. 1, the angled adjustable spare tire carrier 200 can include an extender 300, discussed in detail below.

Figure 2:
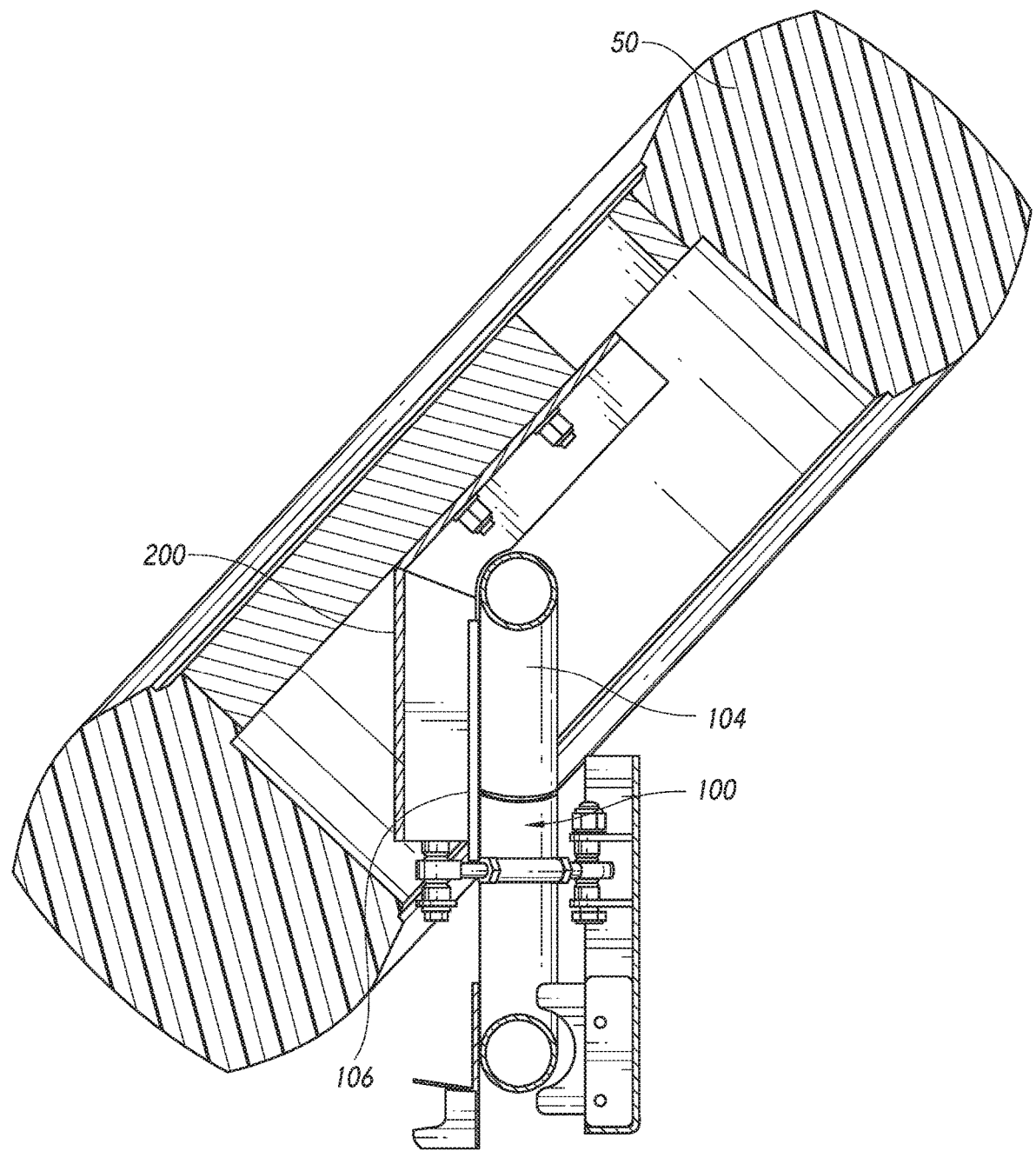
FIG. 2 illustrates an embodiment of an angled adjustable spare tire carrier with a spare tire on the angled section without an extender.
Figure 3:
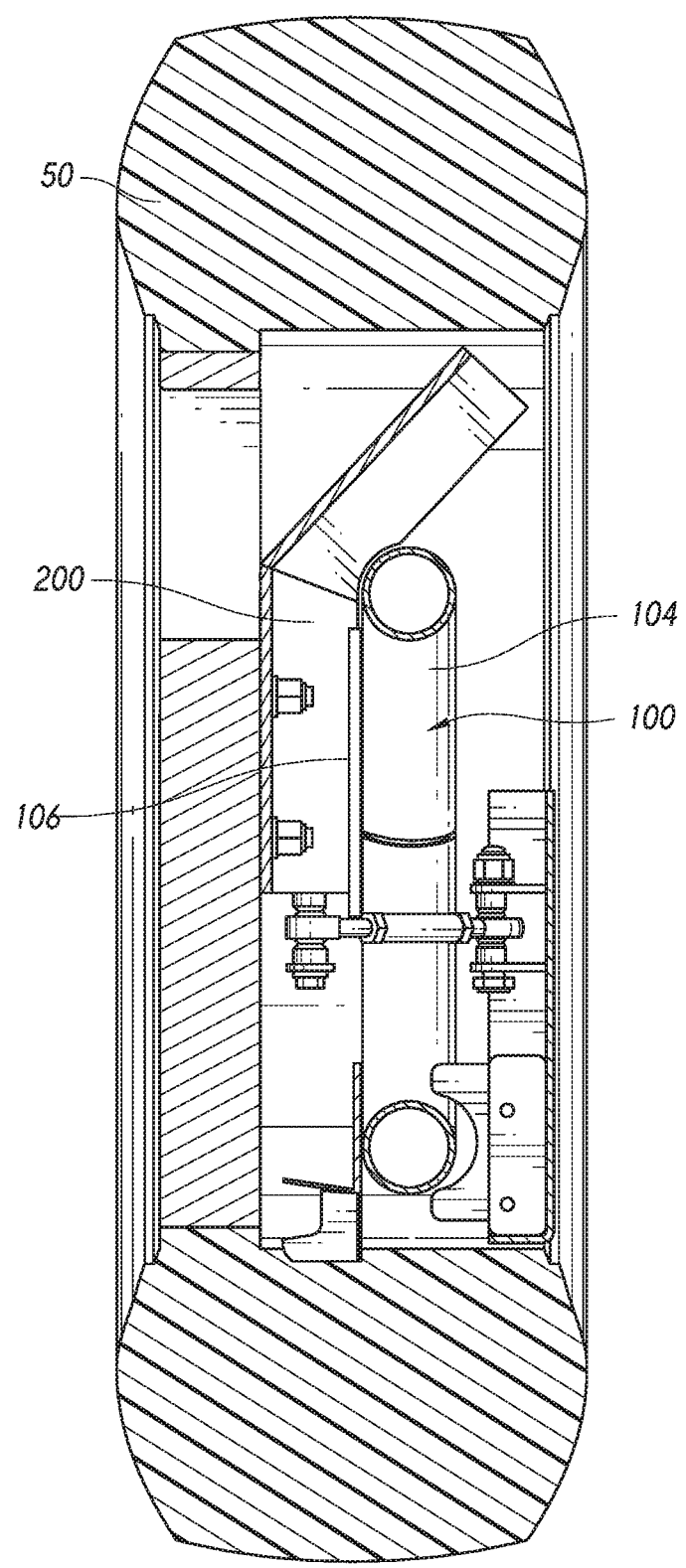
FIG. 3 illustrates an embodiment of an angled adjustable spare tire carrier with a spare tire on the straight section without an extender.

FIGS. 2-3 illustrate a spare tire 50 attached at two different positions on the angled adjustable spare tire carrier 200 and without extender 300. FIG. 2 shows the wheel 50 attached on the second leg 204 while FIG. 3 shows the wheel 50 attached on the first leg 202. Thus, a user can move a spare tire 50 between the two positions, while still maintaining a stable spare tire 50 position, depending on situational need.

Figure 4:
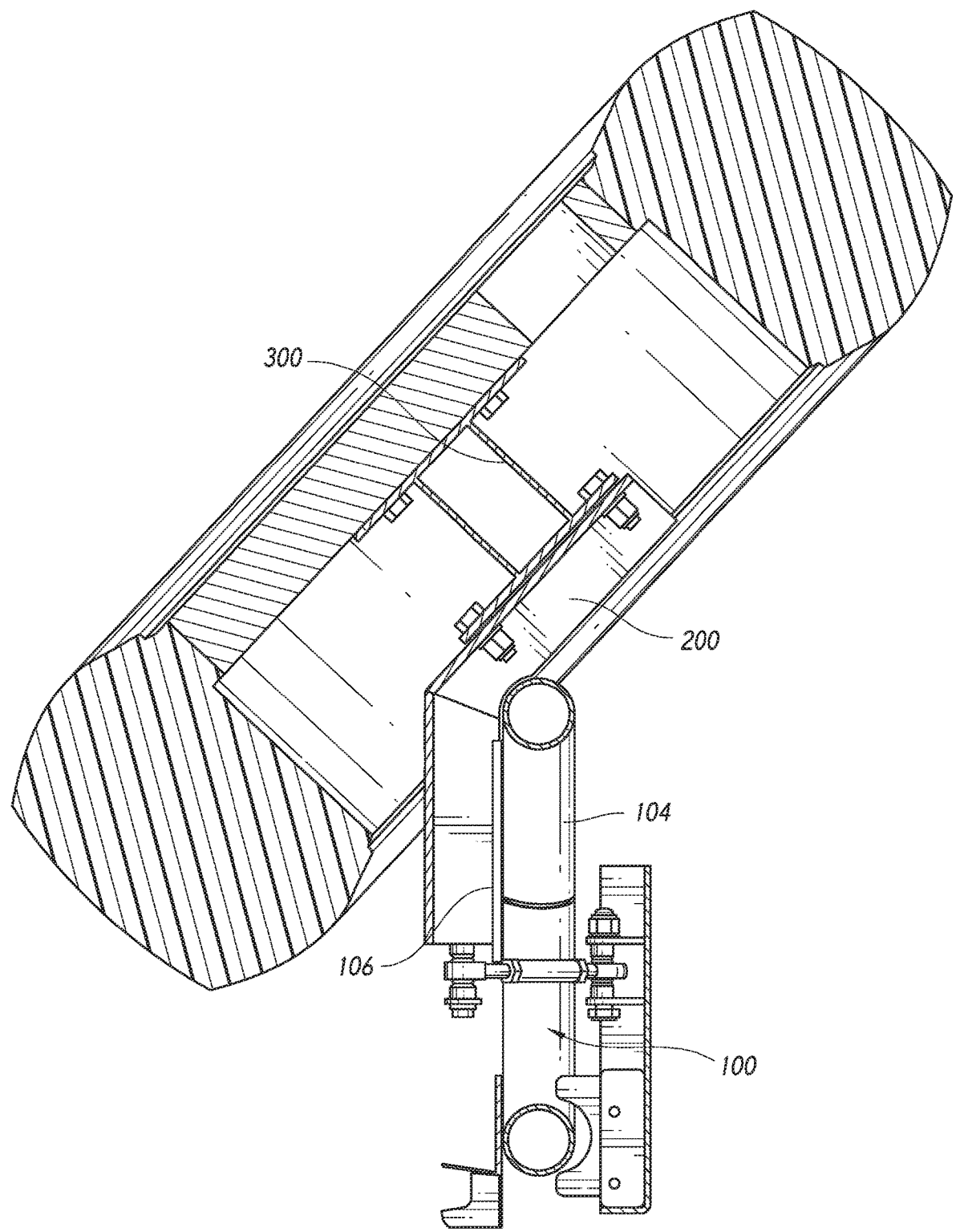
FIG. 4 illustrates an embodiment of an angled adjustable spare tire carrier with a spare tire on the angled section with an extender.
Figure 5:
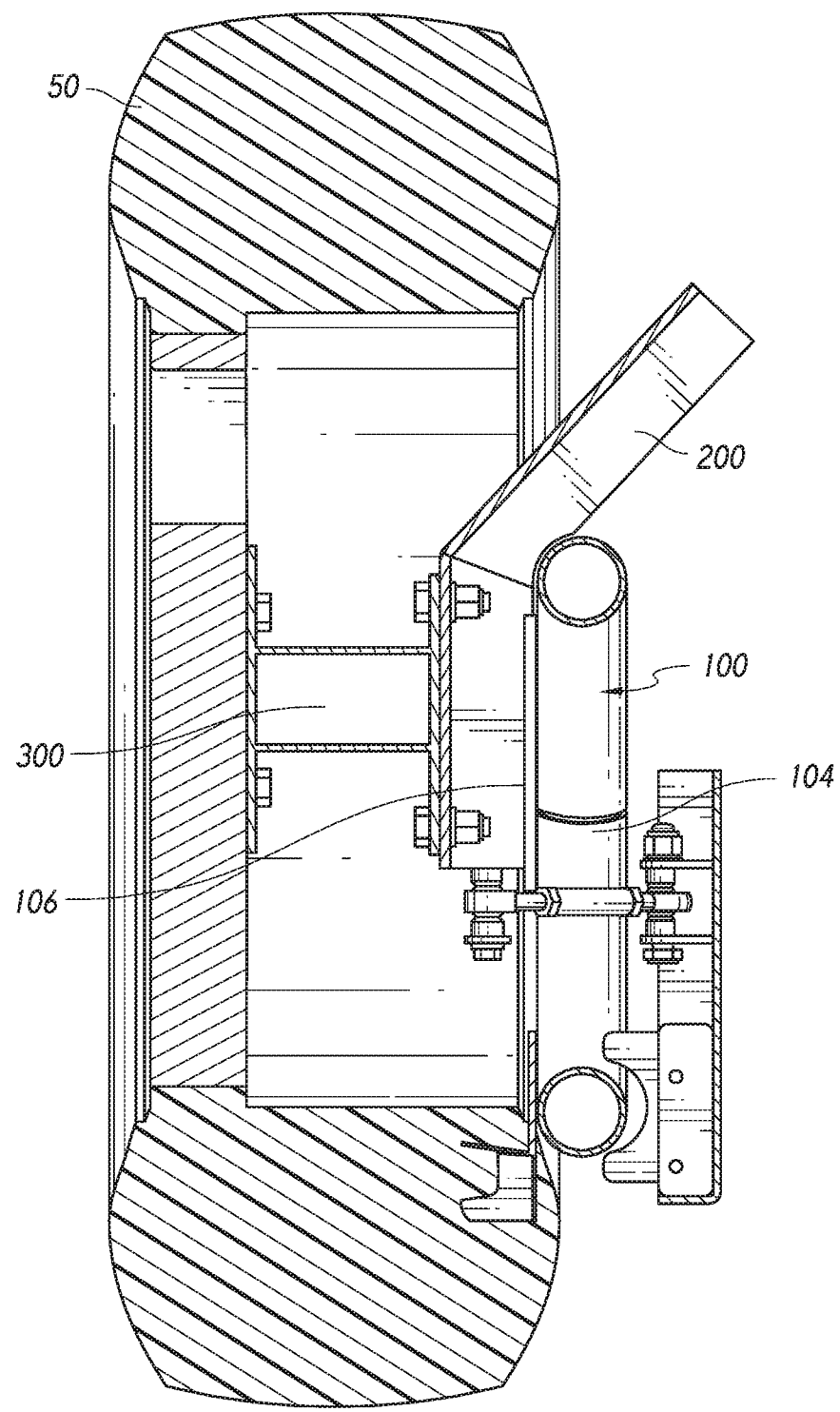
FIG. 5 illustrates an embodiment of an angled adjustable spare tire carrier with a spare tire on the straight section with an extender.
Figure 6A:
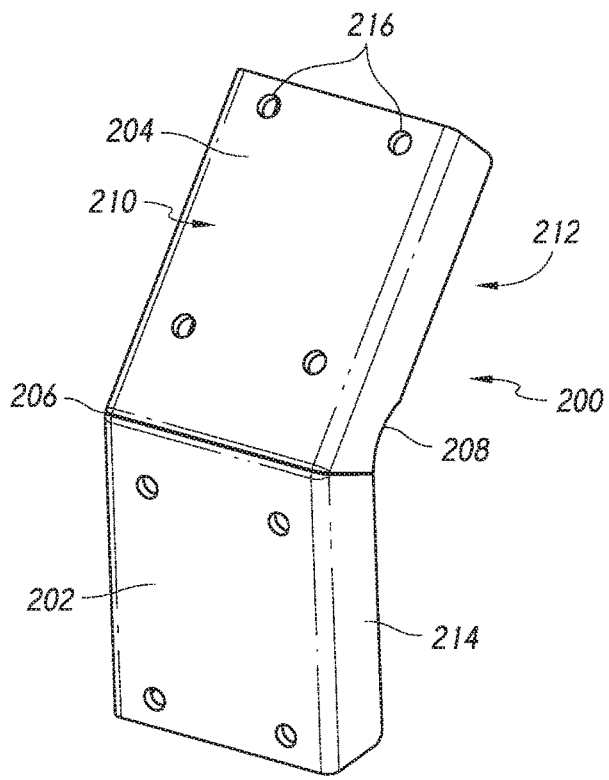
FIGS. 6A-D illustrate an embodiment of an angled adjustable spare tire carrier.
Figure 6B:
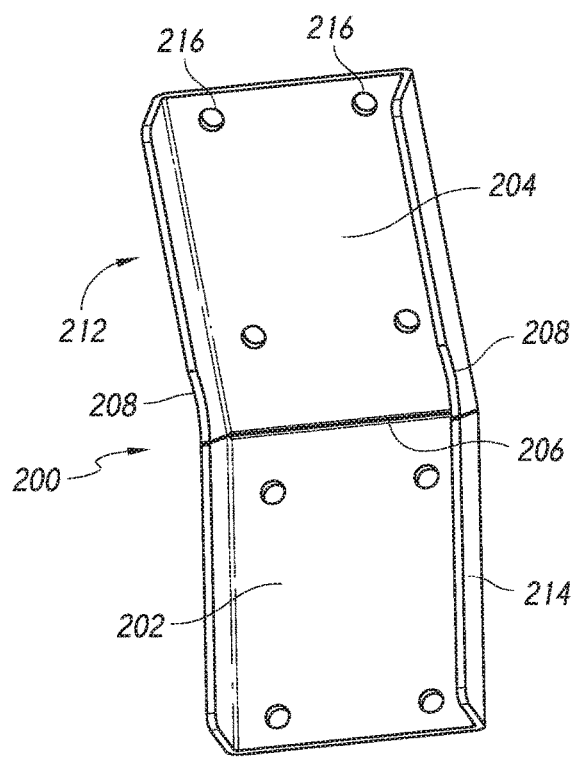
Figure 6C:
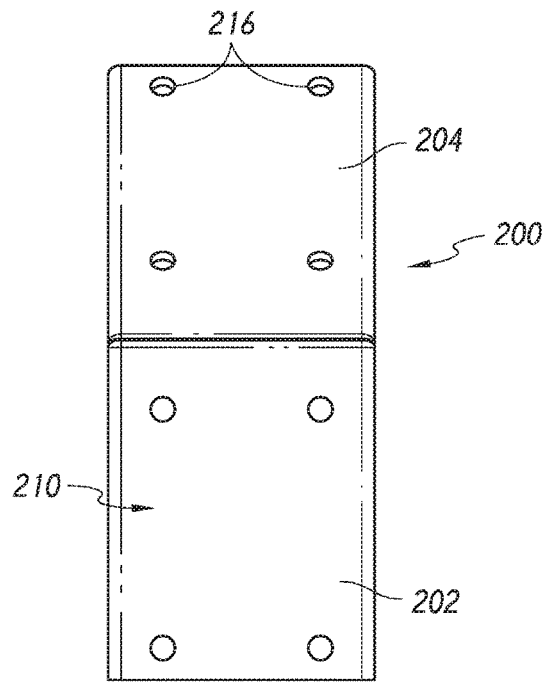
Figure 6D:
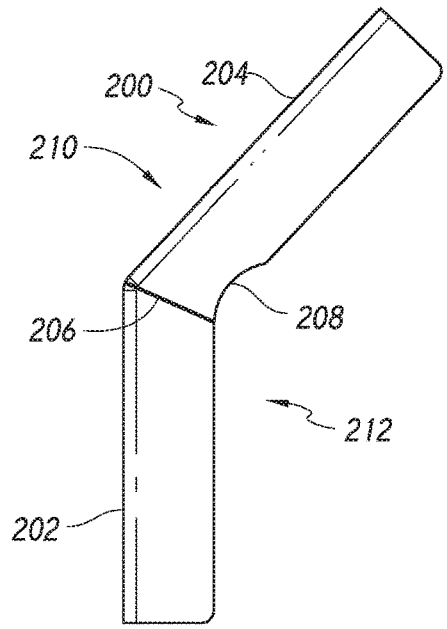
Figure 7:
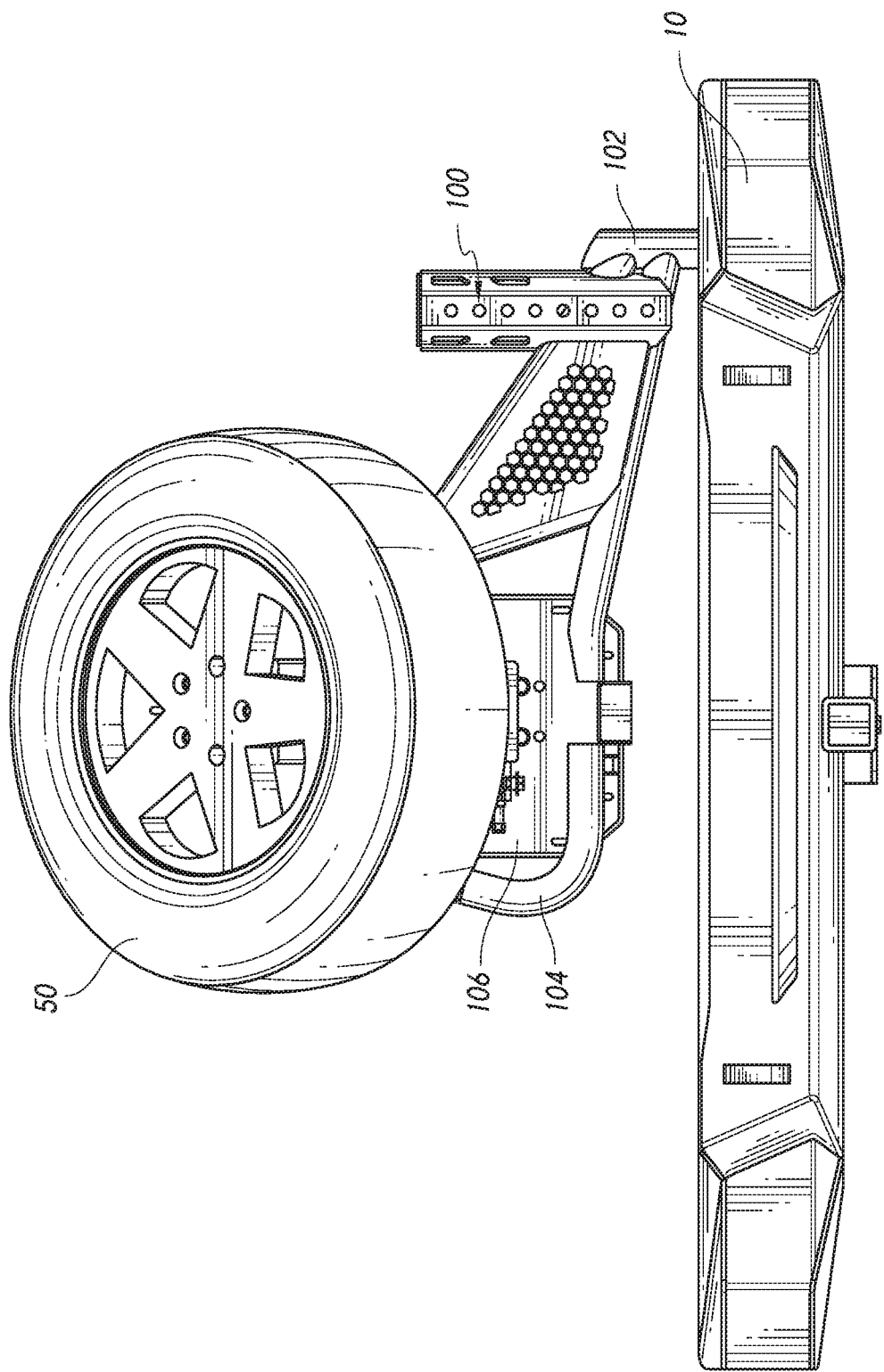
FIG. 7 illustrates a view of an embodiment of an angled adjustable tire carrier attached to a spare tire mount and bumper.
Figure 8:
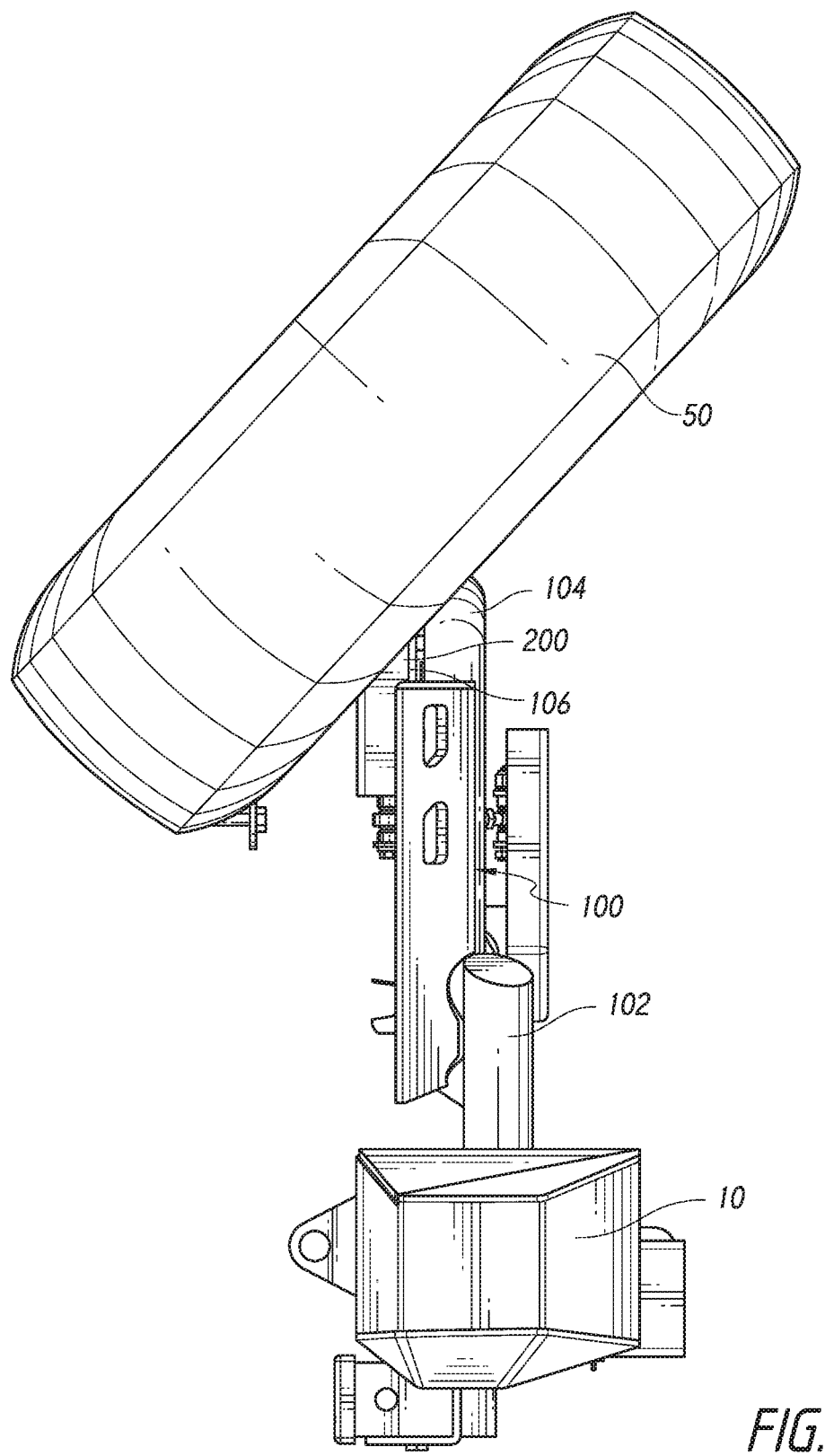
FIG. 8 illustrates a view of an embodiment of an angled adjustable tire carrier attached to a spare tire mount and bumper.
Figure 9:
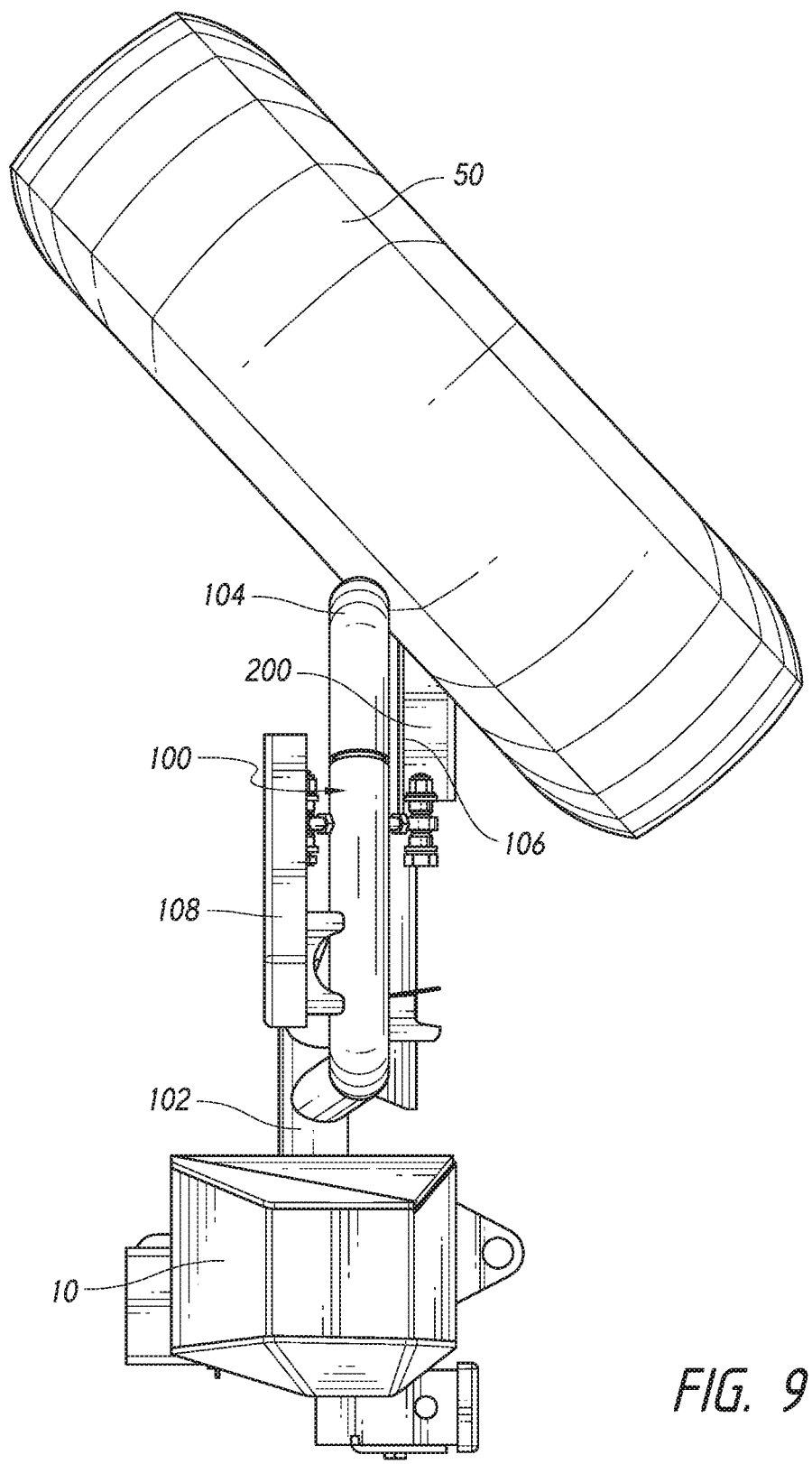
FIG. 9 illustrates a view of an embodiment of an angled adjustable tire carrier attached to a spare tire mount and bumper.
Figure 10:
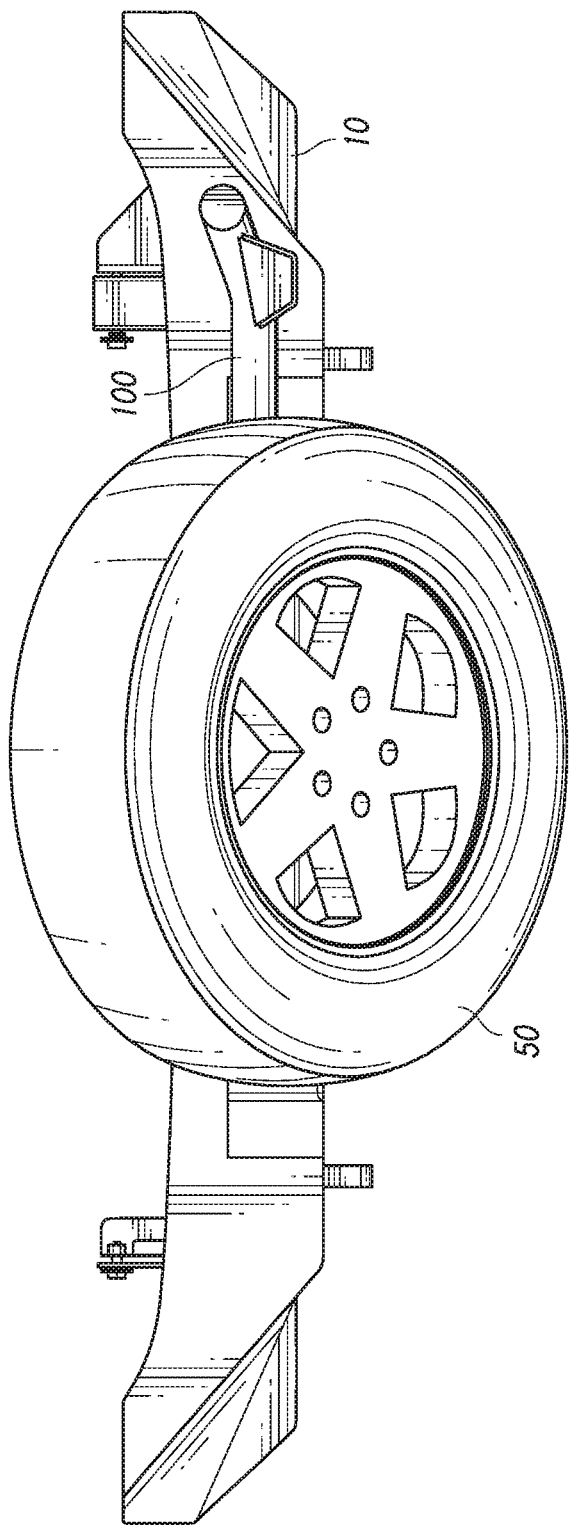
FIG. 10 illustrates a view of an embodiment of an angled adjustable tire carrier attached to a spare tire mount and bumper.
Figure 11:
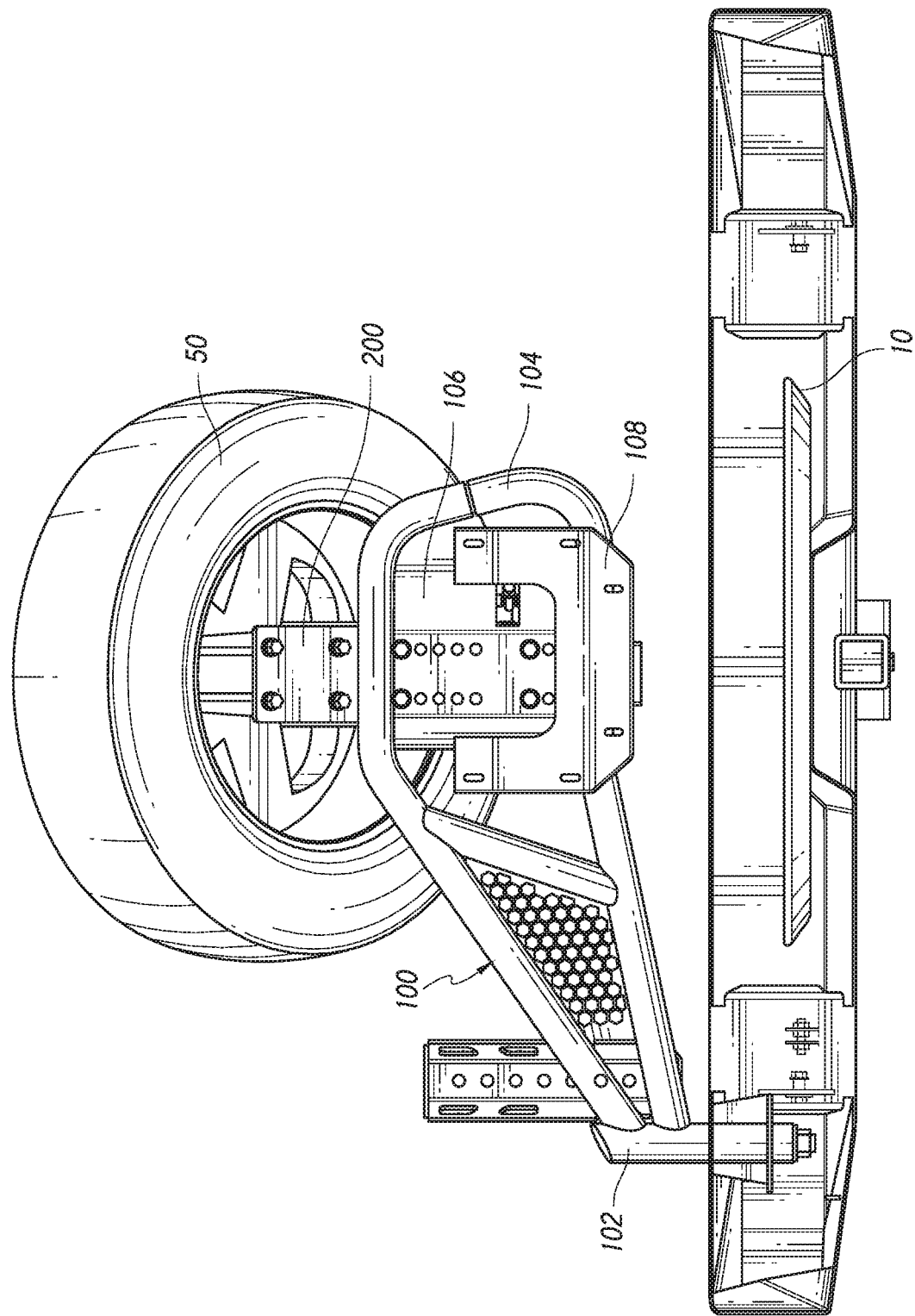
FIG. 11 illustrates a view of an embodiment of an angled adjustable tire carrier attached to a spare tire mount and bumper.

FIGS. 4-5 illustrate a spare tire attached at two different positions on the angled adjustable spare tire carrier 200 and with extender 300. FIG. 4 shows the wheel 50 attached on the second leg 204 while FIG. 5 shows the wheel 50 attached on the first leg 202. Thus, similarly, a user can move a spare tire 50 between the two positions, depending on situational need. Further, the extender 300 can be used to locate the spare tire 50 further rearward of the vehicle, which may be desirable for oversized tires.

FIGS. 6A-D illustrates the angled adjustable spare tire carrier 200 detached from a vehicle. As shown, in some embodiments the angled adjustable spare tire carrier 200 can be generally rectangular in shape when viewed from the front. In some embodiments, the angled adjustable spare tire carrier 200 can be tubular. The particular shape of the angled adjustable spare tire carrier 200 does not limit the disclosure.

In some embodiments, the length of the first and second leg 202/204 can be 10, 11, 12, 13, 14, 15, 16, 17, 18, 19, 20, 21, 22, 23 or 24 inches. In some embodiments, the length of the first and second leg 202/204 can be greater than 10, 11, 12, 13, 14, 15, 16, 17, 18, 19, 20, 21, 22, 23 or 24 inches. In some embodiments, the length of the first and second leg 202/204 can be less than 10, 11, 12, 13, 14, 15, 16, 17, 18, 19, 20, 21, 22, 23 or 24 inches.

In some embodiments, the width of the first and second leg 202/204 can be 10, 11, 12, 13, 14, 15, 16, 17, 18, 19, 20, 21, 22, 23 or 24 inches. In some embodiments, the width of the first and second leg 202/204 can be greater than 10, 11, 12, 13, 14, 15, 16, 17, 18, 19, 20, 21, 22, 23 or 24 inches. In some embodiments, the width of the first and second leg 202/204 can be less than 10, 11, 12, 13, 14, 15, 16, 17, 18, 19, 20, 21, 22, 23 or 24 inches.

In some embodiments, the thickness of the first and second leg 202/204 can be 0.5, 1, 1.5, 2, 2.5, 3, 3.5, 4, 4.5, 5, 5.5, or 6 inches. In some embodiments, the thickness of the first and second leg 202/204 can be greater than 0.5, 1, 1.5, 2, 2.5, 3, 3.5, 4, 4.5, 5, 5.5, or 6 inches. In some embodiments, the thickness of the first and second leg 202/204 can be less than 0.5, 1, 1.5, 2, 2.5, 3, 3.5, 4, 4.5, 5, 5.5, or 6 inches.

In some embodiments, the length, width, and thickness of the first and second leg 202/204 can be the same. In some embodiments, the length, width, and thickness of the first and second leg 202/204 can differ, either individually or all.

Further, as shown in FIG. 6, the angled adjustable spare tire carrier 200 can include a number of holes/apertures 216 on the second leg 204 for attaching a spare tire 50, the extender 300, or other components as needed. The apertures can extend partially or fully through the second leg 204. For example, the second leg 204 can include 1, 2, 3, 4, 5, 6, 7, or 8 apertures. These apertures can be used to screw or bolt a component, such as the spare tire 50 or extender 300, onto the angled adjustable spare tire carrier 200. In some embodiments, four apertures are used and are located in a square or rectangular pattern.

Similarly, in some embodiments the first leg 202 can include apertures for attaching to the body 102. For example, the first leg 202 can include 1, 2, 3, 4, 5, 6, 7, or 8 apertures. In some embodiments, four apertures are used and are located in a square or rectangular pattern. As the first leg 202 is configured for attachment to the spare tire mount 100, it may contain additional apertures as compared to the second leg 204. In some embodiments, the same apertures may be used to mount the spare tire 50 and/or the extender 300, and the spare tire mount 100 together with the angled adjustable spare tire carrier 200. In some embodiments, different apertures can be used to attach the spare tire/extender 50/300 as compared to the spare tire mount 100. Thus, the spare tire/extender 50/300 can be removed without removing the angled adjustable spare tire carrier 200 from the spare tire mount 100. In some embodiments, there may be markings showing the different apertures. In some embodiments, the apertures may be different sizes.

As shown in the figures, the angled adjustable spare tire carrier 200 can be angled inwards towards the vehicle. However, the angled adjustable spare tire carrier 200 can also be angled away from the vehicle. Further, the angled adjustable spare tire carrier 200 can extend in any direction from the spare tire mount 100, such as vertically up, vertically down, horizontally in one direction, horizontally in the opposite direction, or an intermediate position between any of these.

Figure 12:
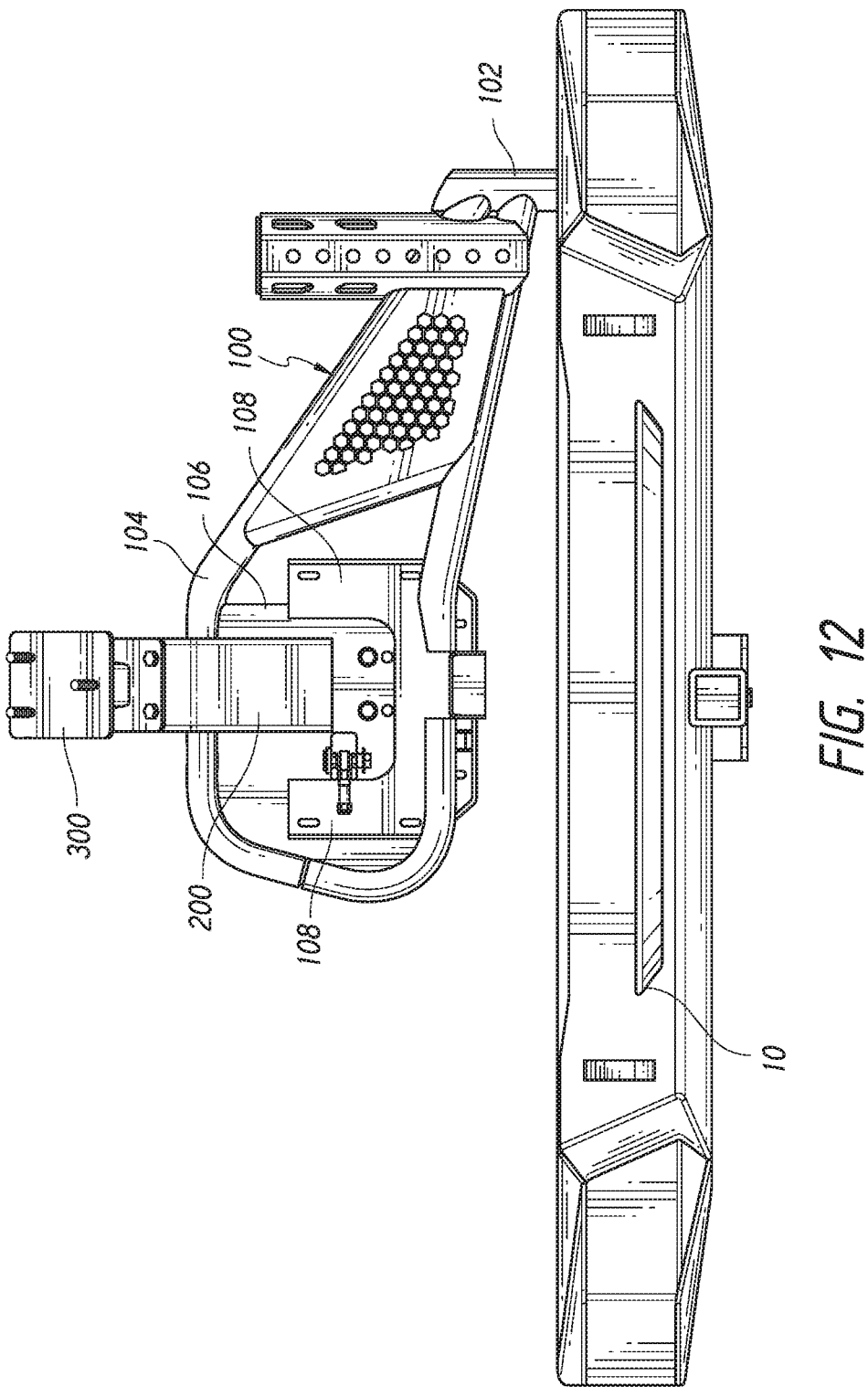
FIG. 12 illustrates a view of an embodiment of an angled adjustable tire carrier attached to a spare tire mount and bumper.

FIGS. 7-12 illustrate different viewpoints of embodiments of the angled adjustable spare tire carrier 200 attached to a spare tire mount 100 which is attached to a vehicle. FIGS. 7-11 show a spare tire 50 attached to the angled adjustable spare tire carrier 200, whereas FIG. 12 shows the spare tire removed.

As shown, the spare tire mount 100 can be attached to a bumper 10 by a rotatable tube 102. The rotatable tube 102 can be located on a left side, a right side, or a center of bumper 10, and the particular position does not limit the disclosure. Further, the rotatable tube 102 may be attached to the vehicle at a location other than the bumper 10, such as at the trunk door. While a rotatable tube 102 is described herein, this portion may not be a tube and may be another design configured for rotation, such as a rectangular prism.

The tube 102 can be mounted on the bumper 10 so that the spare tire mount 100 can rotate along a vertical axis of the tube 102, thus allowing the spare tire mount 100 to rotate outwards and away from the vehicle. In some embodiments, the spare tire mount 100 may be able to rotate 45°, 90°, 135°, or 180°. In some embodiments, the spare tire mount 100 may be able to rotate less than 45°, 90°, 135°, or 180°. In some embodiments, the spare tire mount 100 may be able to rotate greater than 45°, 90°, 135°, or 180°. In some embodiments, the spare tire mount 100 can be capable or 360° rotation and is only prevented by the spare tire mount 100 interacting with the vehicle. In some embodiments, the spare tire mount 100 may have a lock or stop for preventing rotation of the spare tire mount 100 when not desired. For example, the spare tire mount 100 may lock to the rear of a vehicle on a side opposite the tube 102.

The tube 102 can be attached to a mounting frame 104. The mounting frame 104 can be one or more tubes that general form a perimeter for attachment of the angled adjustable spare tire carrier 200. In some embodiments, the mounting frame 104 is rotatable with respect to the rotatable tube 102. In some embodiments, the mounting frame 105 is attached to the tube 102 to prevent rotation. The mounting frame 104 can be attached to a side of the tube 102 in some embodiments, and at a top of the tube 102 in some embodiments. The mounting frame 104 can further include aesthetic components as desired by a user. These aesthetic components may be removable or permanent. Further, the mounting frame 104 may include attachment components for useful items (such as tools, gas cans, boxes) to attach to the mounting frame 104. The mounting frame 104 can generally extend across a width of the vehicle from the rotatable tube 102 so that the spare tire can be generally mounted on a centerline of the vehicle. However, the particular mounting position of the spare tire does not limit the disclosure.

In some embodiments, the mounting frame 104 may include an attachment surface 106, such as extending between tubes of the mounting frame 104. The attachment surface 106 may include a number of apertures in order to attach, such as bolt, the angled adjustable spare tire carrier 200 to the attachment surface 106. The attachment surface 106 may be generally flat for appropriate mounting. In some embodiments, the angled adjustable spare tire carrier 200 may be mounted to a rearward facing surface of the mounting surface 108. In some embodiments, the angled adjustable spare tire carrier 200 may be mounted to a front facing surface of the attachment surface 106. The mounting frame 104 may further include an attachment structure 108 for attaching an attachment surface 106 to the mounting frame 104. However, in some embodiments the attachment surface 106 is integrally formed or directly attached to the mounting frame 104. The attachment structure 108 can be generally U-shaped, though the particular shape does not limit the disclosure. The attachment structure 108 and the attachment surface 106 can be on opposite sides of the mounting frame 104, therefore sandwiching the frame 104 between them. The attachment surface 106 and attachment structure 108 can be attached to one another, such as with a bolt. The bolt may be rotatable on either the attachment surface 106 or the attachment structure 108 so that the positions of the components can be moved. The attachment structure 108 can further include grips for partially wrapping around a component of the frame 104. The attachment surface 106 or the attachment structure 108 can be tightened together to retain on the frame 104.

In some embodiments, the mounting frame 104 may not have a mounting surface, and the angled adjustable spare tire carrier 200 can be mounted directly on the mounting frame 104, such as by bolting, clamps, or other fastening mechanisms.

Alternative Angled Adjustable Spare Tire Carrier

FIGS. 13-18 illustrate an alternate embodiment of an angled adjustable spare tire carrier (or bracket) 600.

Figure 13:
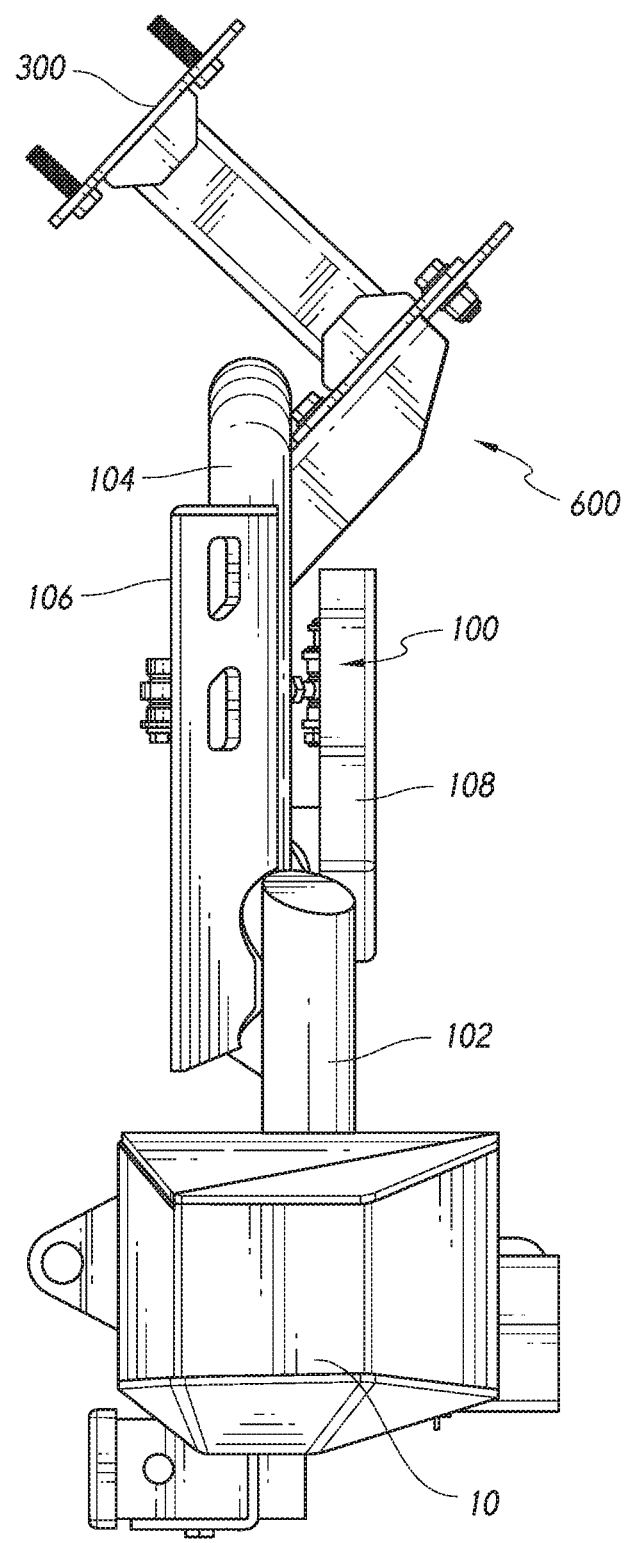
FIG. 13 illustrates an alternate embodiment of an angled adjustable tire carrier with an extender.
Figure 14:
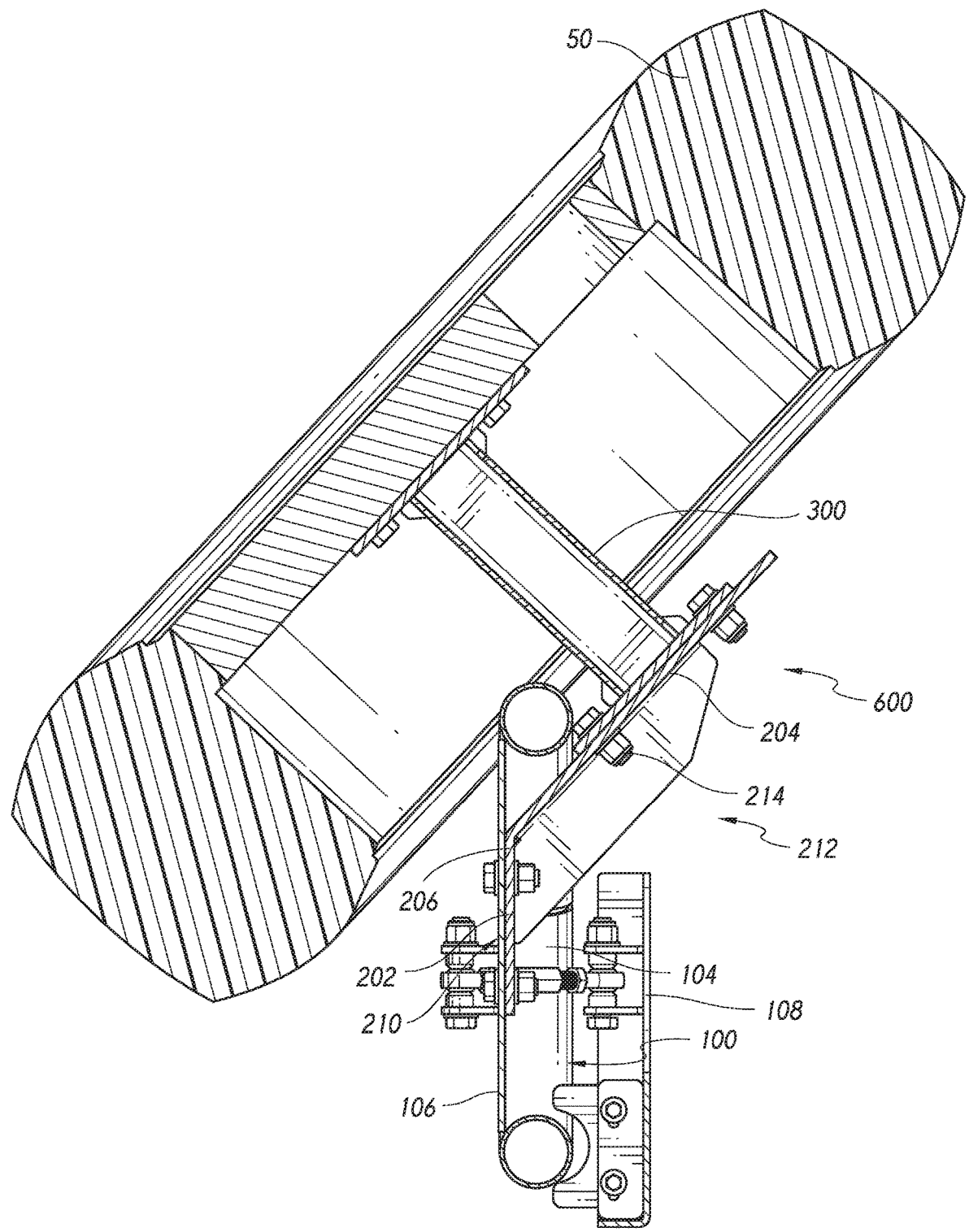
FIG. 14 illustrates the alternate embodiment of an angled adjustable tire carrier with an extender and tire attached on the angled section.
Figure 15:
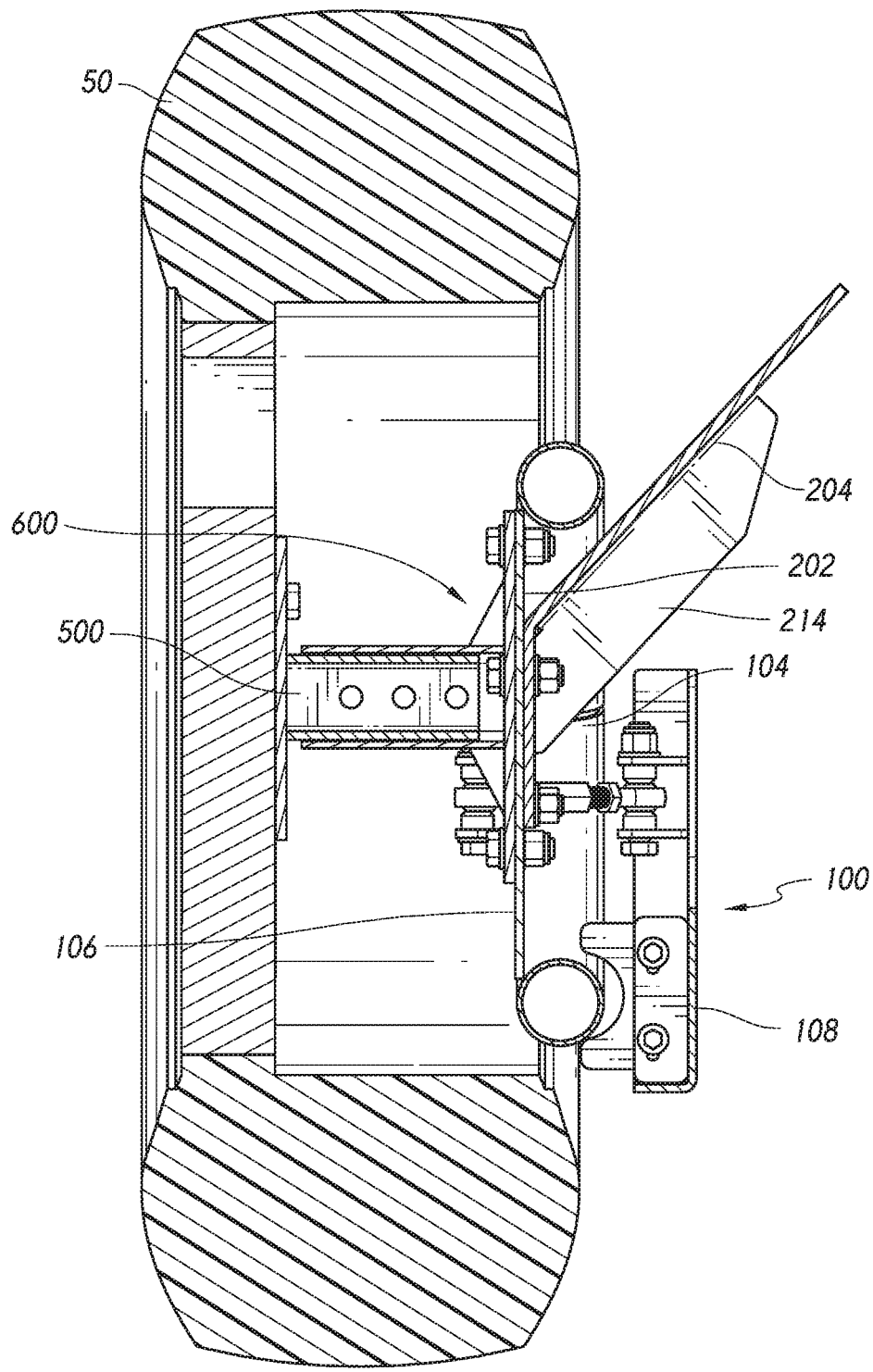
FIG. 15 illustrates the alternate embodiment of an angled adjustable tire carrier with an extender and tire attached on the straight section.

FIG. 13 shows the angled adjustable spare tire carrier 600 attached to a vehicle with an extender 300. FIG. 14 shows the angled adjustable spare tire carrier 600 attached to a vehicle with an extender 300 and a spare tire 50 on the second leg 204. FIG. 15 shows the angled adjustable spare tire carrier 600 attached to a vehicle with an extender 500 and a spare tire 50 on the first leg 202. In some embodiments, an extender 300 may not be used.

FIGS. 16A-D show the angled adjustable spare tire carrier 600 in a number of different views. As shown, the angled adjustable spare tire carrier 600 can be similar to the angled adjustable spare tire carrier 200 discussed above, and may include many or all of the features discussed above.

In some embodiments the first leg 202 may be smaller than the second leg 204. For example, the first leg 202 may have a rear facing surface 210 area that is ¼, ⅓, or ½ the area of the second leg 204. In some embodiments, the first leg 202 may have a rear facing surface 210 area that is less than ¼, ⅓, or ½ the area of the second leg 204. In some embodiments, the first leg 202 may have a rear facing surface 210 area that is greater than ¼, ⅓, or ½ the area of the second leg 204. Further, as shown in FIG. 16A-D, the second leg 204 may include a rounded edge 616.

Additionally, the sidewalls 214 may only be attached to the second leg 204, and thus the first leg 202 may not have any sidewalls 214. In some embodiments, the sidewalls 214 may overlap an outer edge of the first leg 202. In some embodiments, the side walls 214 may not extend as far as the rounded edge 616.

Figure 17:
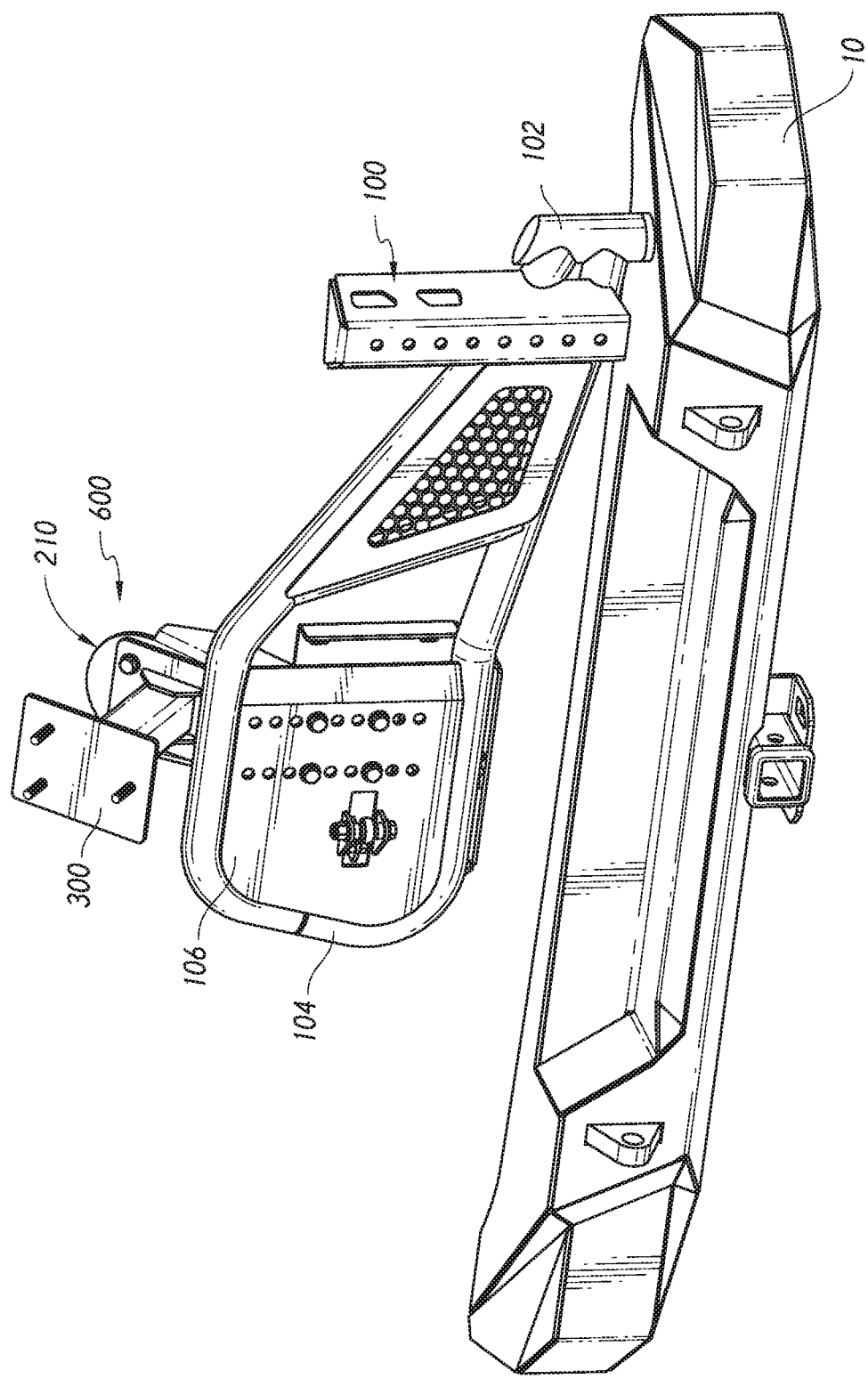
FIG. 17 illustrates a view of a rear facing surface of an alternative angled adjustable spare tire carrier attached to a vehicle.
Figure 18:
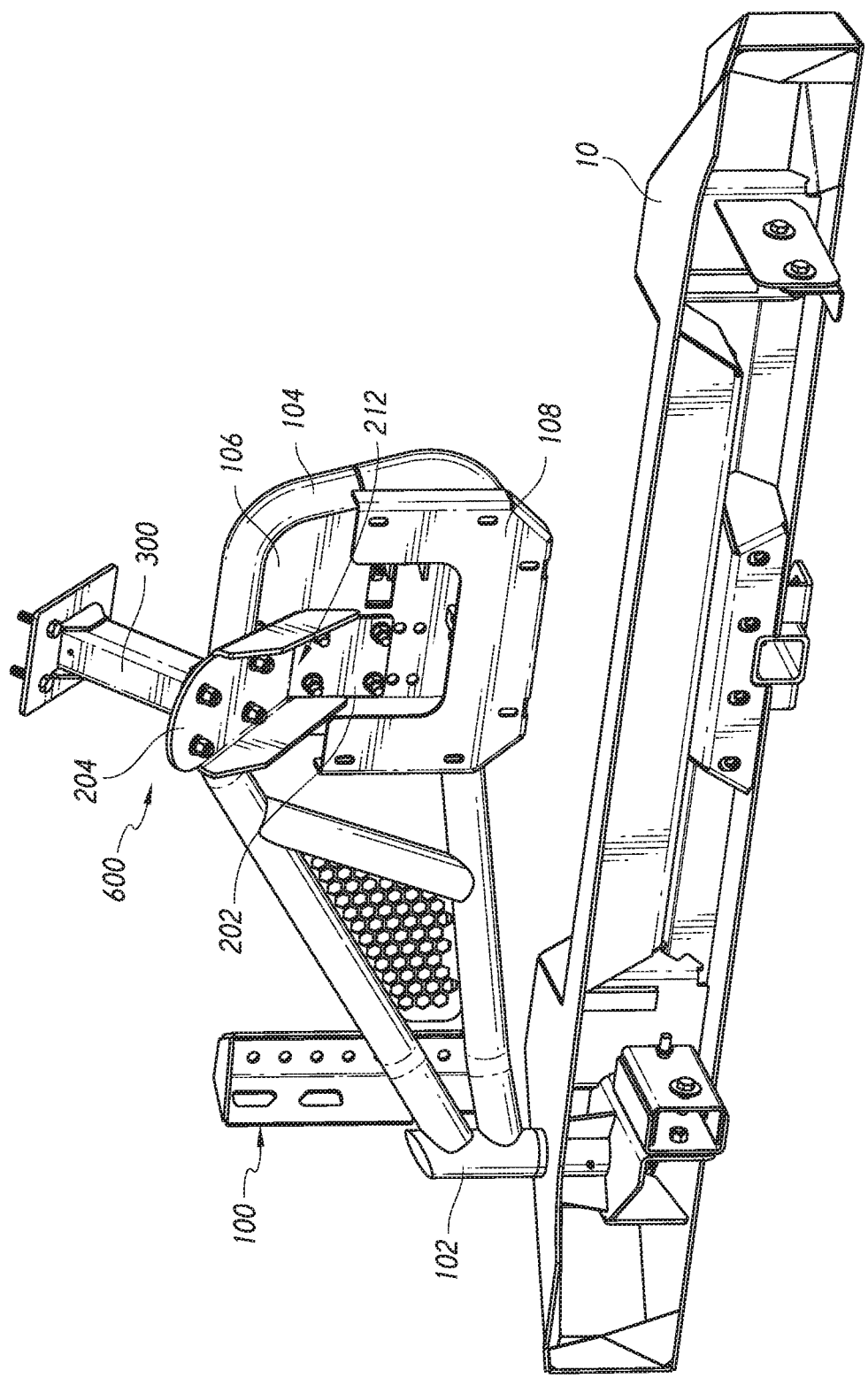
FIG. 18 illustrates a view of a front facing surface of an alternative angled adjustable spare tire carrier attached to a vehicle.
Figure 19:
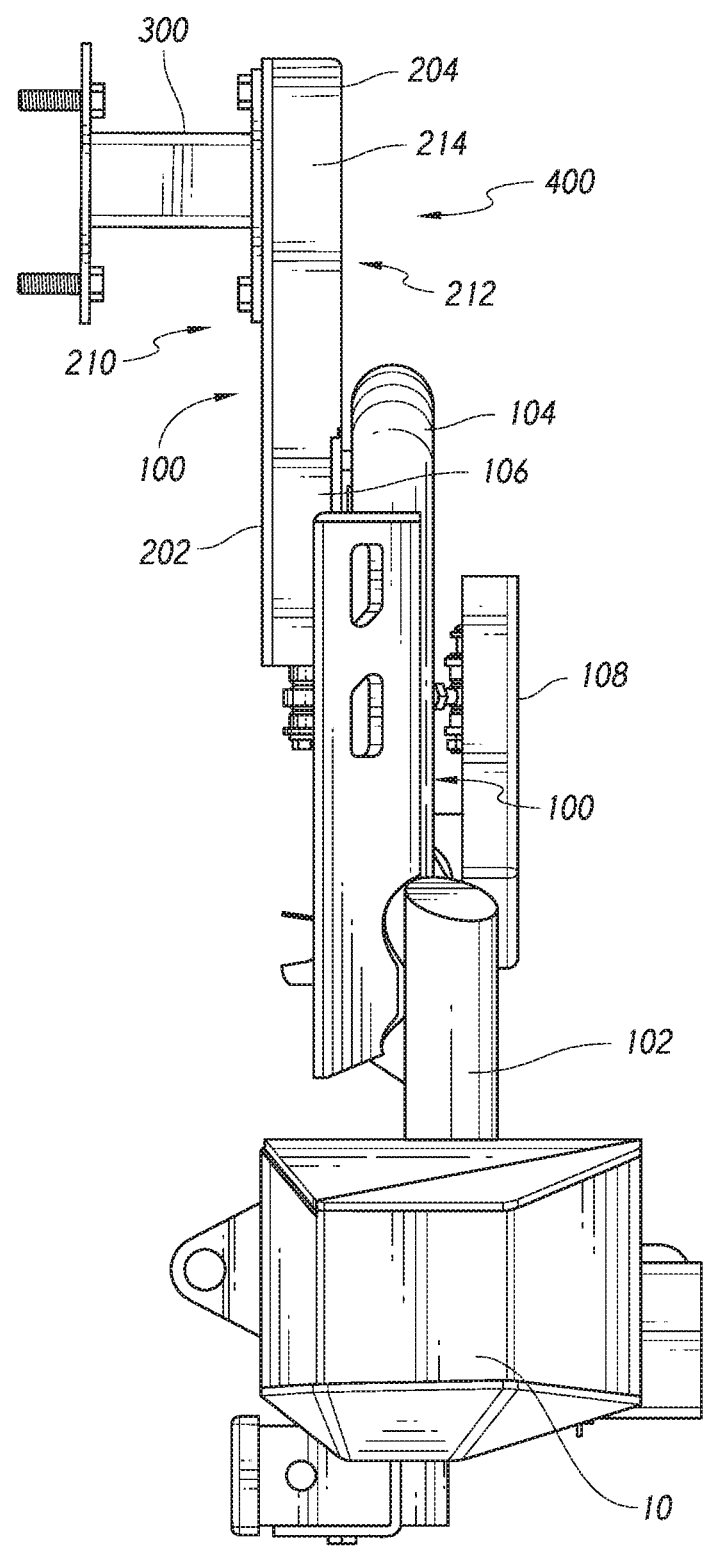
FIG. 19 illustrates an embodiment of a straight adjustable spare tire carrier on a vehicle.
Figure 20:
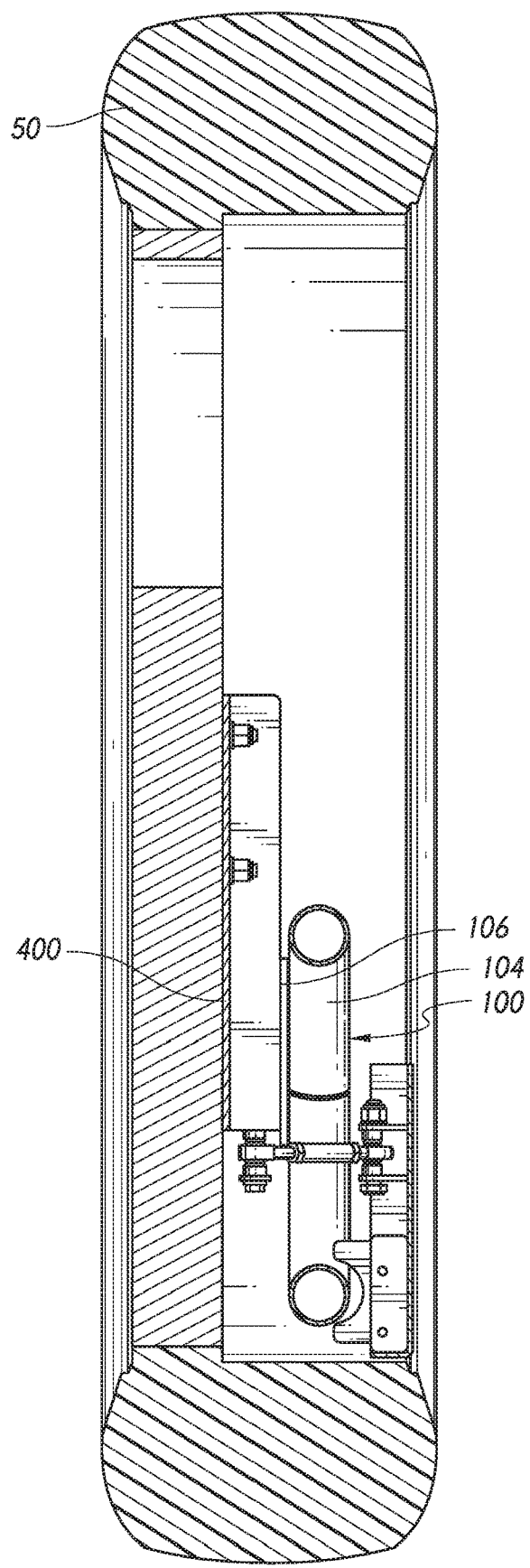
FIG. 20 illustrates an embodiment of a straight adjustable spare tire carrier with a spare tire on the top section without an extender.
Figure 21:
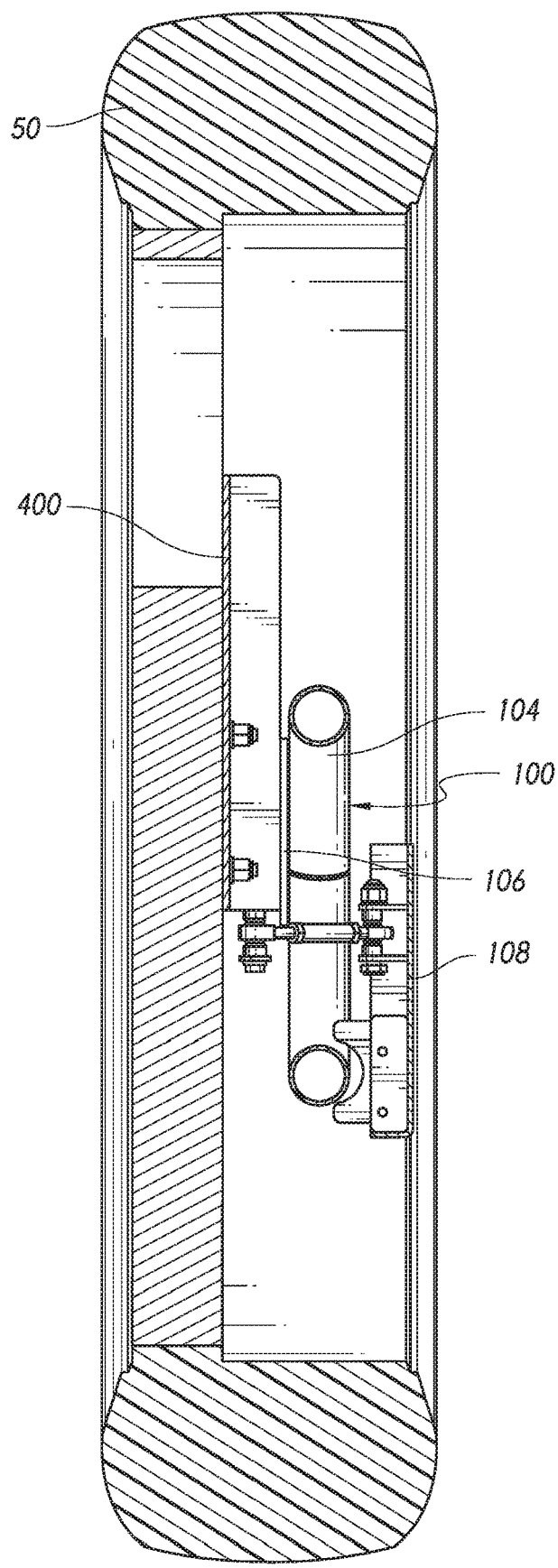
FIG. 21 illustrates an embodiment of a straight adjustable spare tire carrier with a spare tire on the bottom section without an extender.
Figure 22:
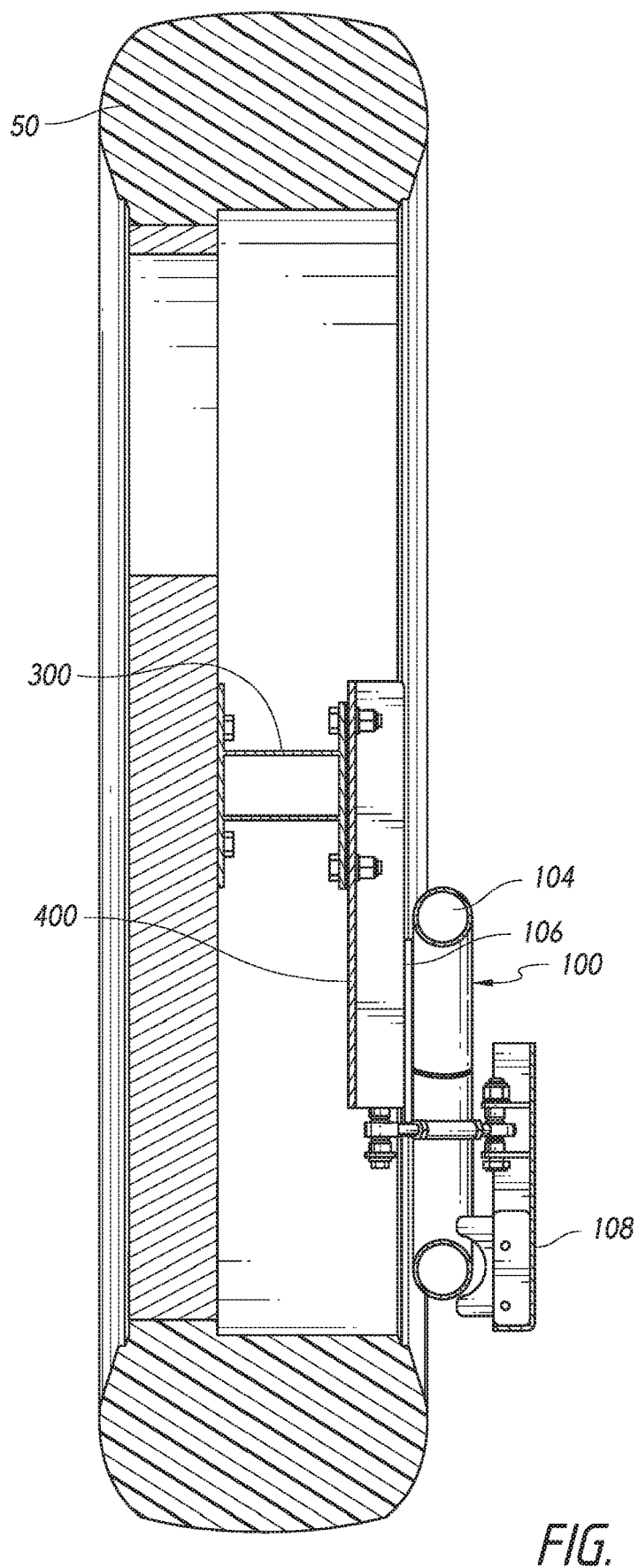
FIG. 22 illustrates an embodiment of a straight adjustable spare tire carrier with a spare tire on the top section with an extender.
Figure 23:
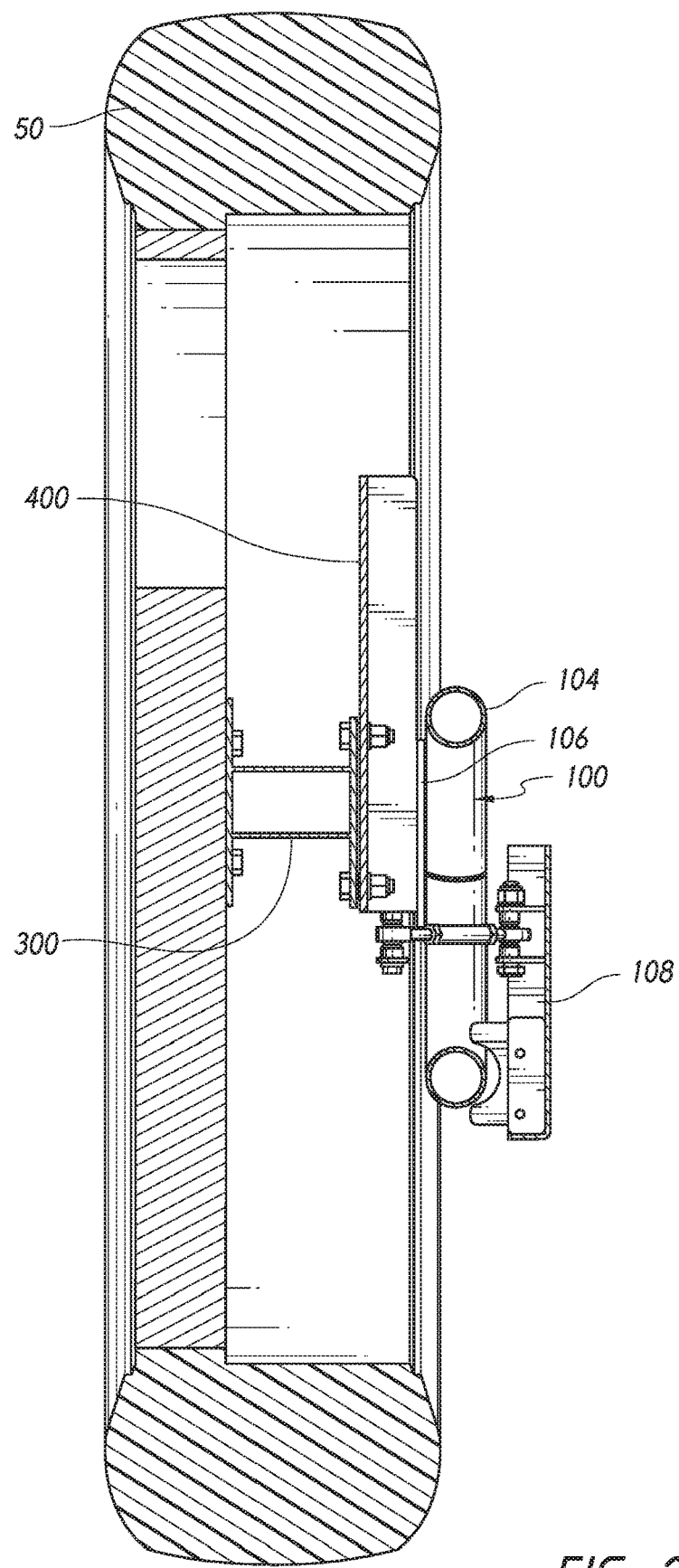
FIG. 23 illustrates an embodiment of a straight adjustable spare tire carrier with a spare tire on the bottom section with an extender.
Figure 24A:
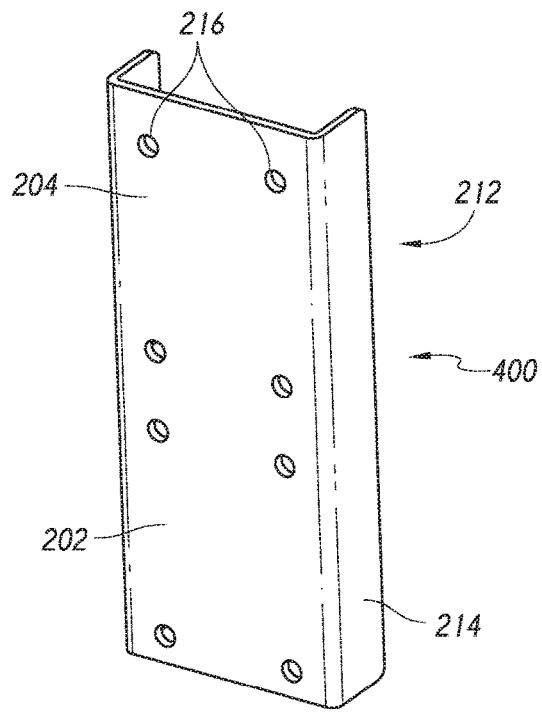
FIGS. 24A-D illustrate views of an embodiment of a straight adjustable spare tire carrier.
Figure 24B:
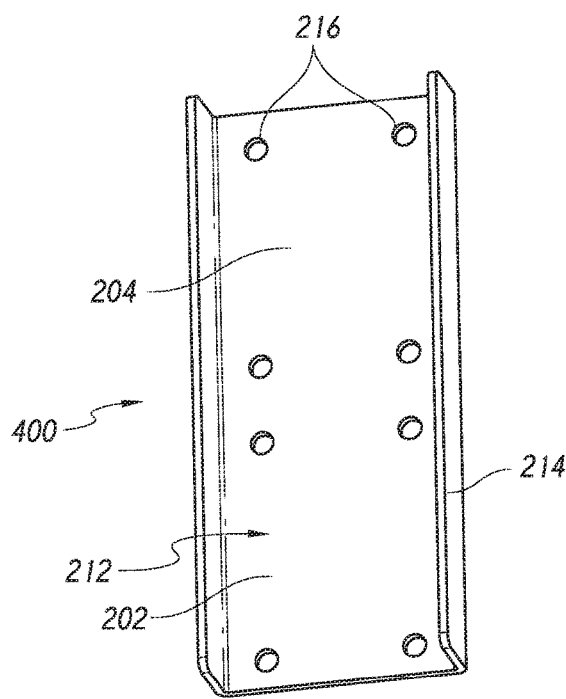
Figure 24C:
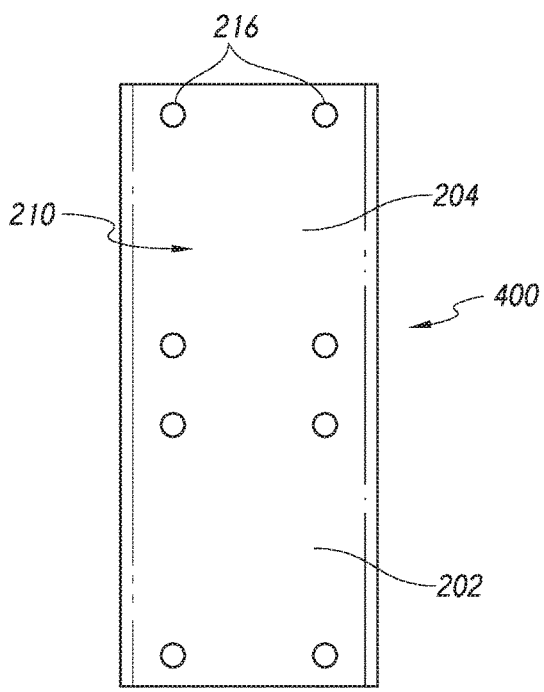
Figure 24D:
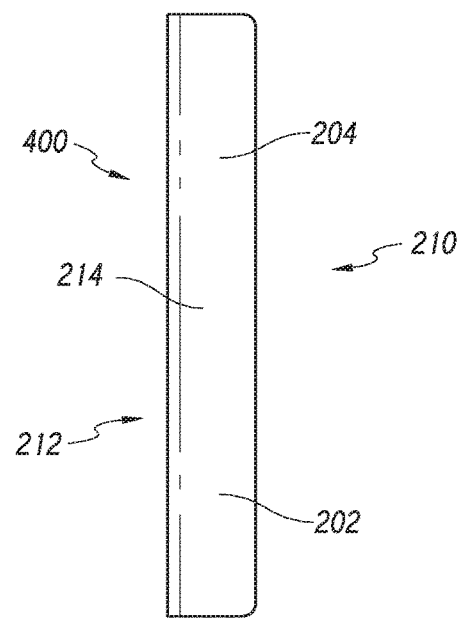

FIG. 17 illustrates a frontward facing view of vehicle having an embodiment of the angled adjustable spare tire carrier 600 attached. FIG. 18 illustrates a rearward facing view of a vehicle having an embodiment of the angled adjustable spare tire carrier 600 attached. As shown, the rear facing surface 210 of the first leg 202 may be attached to a front facing surface of the attachment surface 106. An extender 300 may be attached to the rear facing surface of the attachment surface 106 and connect to the first leg 202 of the angled adjustable spare tire carrier 600. In some embodiments, the angled adjustable spare tire carrier 600 may be attached to the frame 104 without the attachment surface 106. The angled adjustable spare tire carrier 600 can be attached through bolts, clamps, or other fastening means.

Straight Adjustable Spare Tire Carrier

FIGS. 19-24D illustrate embodiments of an adjustable spare tire carrier (or bracket) with angled straight configuration.

The straight adjustable spare tire carrier 400 can include all of the features discussed above with respect to the angled adjustable spare tire carriers 200/600, such as in FIGS. 1-18. However, the rearward facing surface 210 and frontward facing surface 212 of the straight adjustable spare tire carrier 400 may align along the same plane, such as if the angled adjustable spare tire carrier 200/600 had an angle of 180°. In some embodiments, the straight adjustable spare tire carrier 400 may not have a cutout 208.

Extender for Adjustable Spare Tire Carrier

Figure 25A:
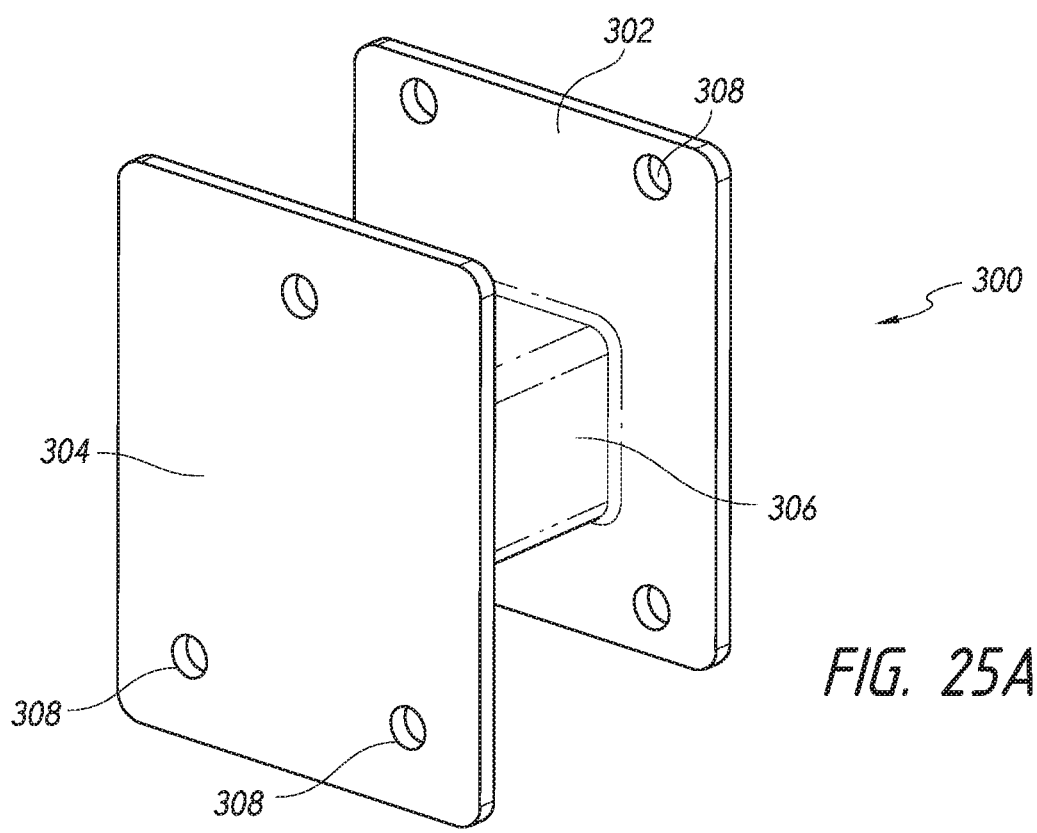
FIGS. 25A-B illustrates an embodiment of an extender for the adjustable spare tire carrier.
Figure 25B:
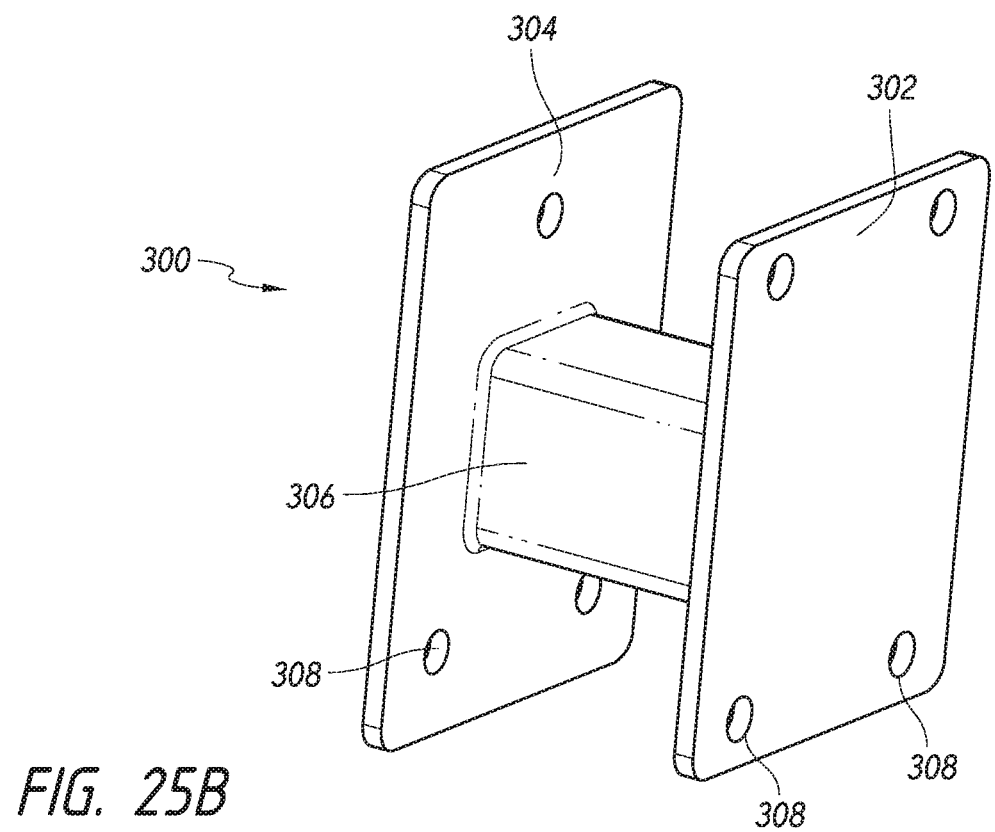

FIGS. 25A-B illustrates an embodiment of an extender (or intermediate component) 300 that can be used with embodiments of the adjustable spare tire carriers discussed above. However, in some embodiments the extender 300 is not used and a tire can directly attach to the adjustable spare tire carrier.

As shown, the extender 300 can be formed from two plates 302/304 attached by a beam 306. The particular shape of the plates 302/304 does not limit the disclosure, and can be a square, triangle, circle, etc. In some embodiments, plates 302/304 may be identical in size and shape. In some embodiments, plates 302/304 may be different in size and shape. For example, plate 302 may have a larger surface area than plate 304. In some embodiments, plate 304 has a larger surface area than plate 302.

In some embodiments, the plate 302 for attachment to the adjustable spare tire carrier may have the same aperture configuration 308 as the adjustable spare tire carrier. In some embodiments, the plate 302 for attachment to the adjustable spare tire carrier may have a greater number of apertures as compared to the adjustable spare tire carrier, and thus some apertures may not be used. In some embodiments, the plate 302 for attachment to the adjustable spare tire carrier may have fewer apertures than the adjustable spare tire carrier, and some apertures on the adjustable spare tire carrier may not be used.

In some embodiments, the plate 304 for attaching to a spare tire may have the same apertures configurations as discussed above, but for connecting to a spare tire instead of the adjustable spare tire carrier.

For the apertures discussed above, they may be configured to receive and retain a bolt for attaching different components.

The length of the beam 306 can provide separation between the two plates 302/304. The dimensions of the beam 306 does not limit the disclosure, but may be generally shaped as a rectangular prism. Thus, the beam 306 can have a different length depending on how far the wheel is desired to be spaced. In some embodiments, the beam 306 is rigid. In some embodiments, the beam 306 can be extendible, such as telescopic, to vary the distance between the plates 302/304. In some embodiments, the beam 306 may have a straight connection between the plates 302/304 so that plates 302/304 are parallel to one another. Further, a center of the plates 302/304 and the beam 306 can be aligned. In some embodiments, the beam 306 may have an angled connection to the plates 302/304. In some embodiments, the plates 302/304 may be parallel. In some embodiments, the plates 302/304 may not be parallel. In some embodiments, a center of the plates 302/304 may be spaced apart from one another.

In some embodiments, the beam 306 can have length of 1, 2, 3, 4, 5, 6, 7, 8, 9, 10, 11, or 12 inches. In some embodiments, the beam 306 can have length of greater than 1, 2, 3, 4, 5, 6, 7, 8, 9, 10, 11, or 12 inches. In some embodiments, the beam 306 can have length of less than 1, 2, 3, 4, 5, 6, 7, 8, 9, 10, 11, or 12 inches.

Figure 26A:
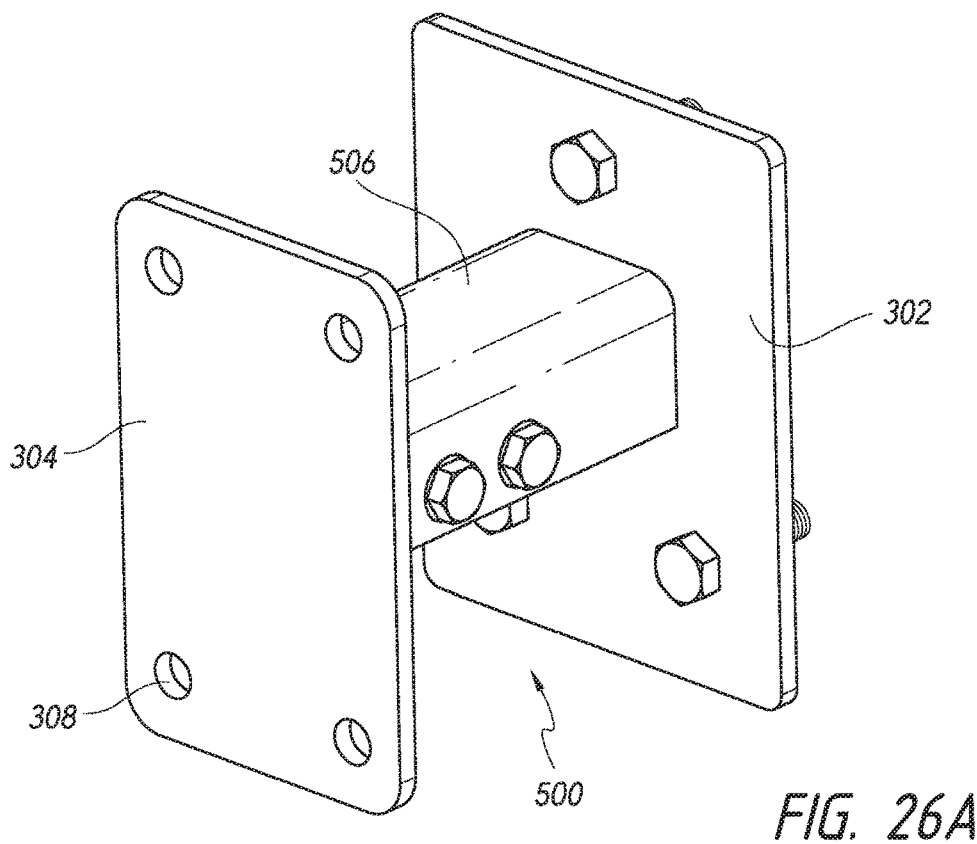
FIGS. 26A-B illustrates an alternate embodiment of an extender for the adjustable spare tire carrier.
Figure 26B:
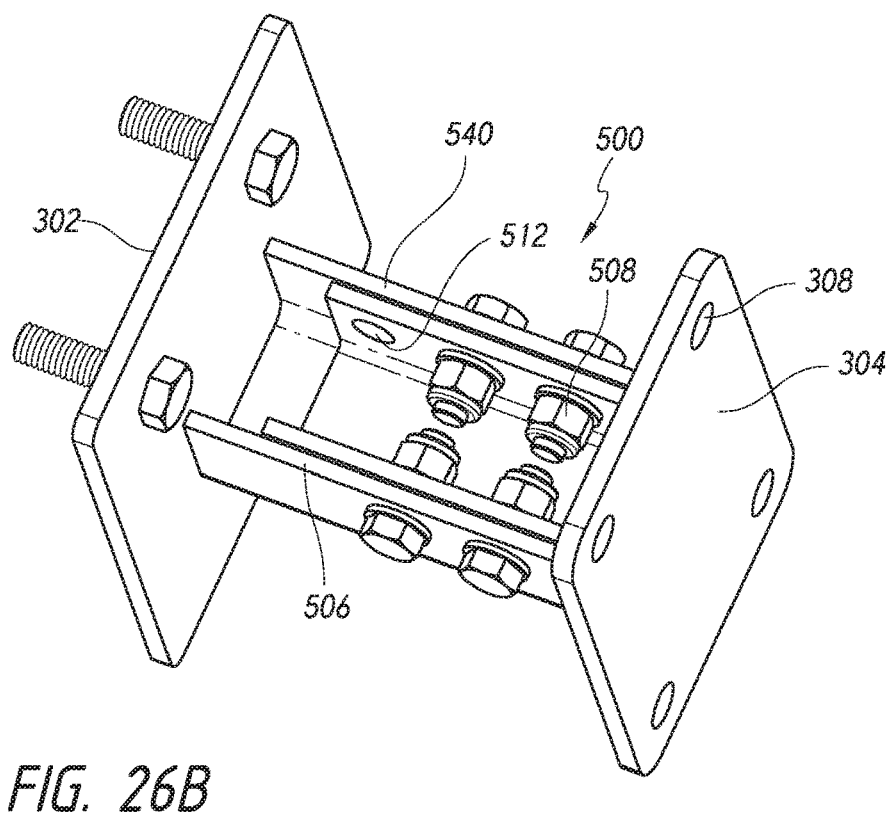

FIGS. 26A-B illustrate an alternative embodiment of an extender 500. As shown, bolts have been installed into the apertures 308 of plate 302 for connecting the extender 500 to a vehicle or a spare tire.

The extender 500 can have the same features as discussed above with respect to extender 300. Hover, extender 500 can include a variable length beam 506, which can be adjusted to move a spare tire further or closer from the vehicle. As shown, the variable length beam 506 can include an internal beam 508 and an external beam 510. The internal beam 508 can fit in and extend at least partially within the external beam 510. The beams 508/510 are configured to slide with respect to one another to increase the distance between plates 302/304. As shown in FIG. 26B, the beams 508/510 can include a plurality of apertures 512 on opposite sides that can receive a bolt, attaching the beams 508/510 together at a particular position. Each beam 508/510 can have 2, 3, 4, 5, 6 or 7 apertures 512 on each side. In some embodiments, each beam 508/510 can have greater than 2, 3, 4, 5, 6 or 7 apertures 512 on each side. In some embodiments, each beam 508/510 can have less than 3, 4, 5, 6 or 7 apertures 512 on each side. Thus, bolts can be removed, the beams 508/510 can be slid apart or together, and the bolts reinstalled to adjust the overall length of the beam 508/510 combination.

The beams 508/510 can be adjusted to have 1, 2, 3, 4, 5, 6, 7, 8, 9, 10, 11, or 12 inches of length change. In some embodiments, the beams 508/510 can be adjusted to have greater than 1, 2, 3, 4, 5, 6, 7, 8, 9, 10, 11, or 12 inches of length change. In some embodiments, the beams 508/510 can be adjusted to have less than 1, 2, 3, 4, 5, 6, 7, 8, 9, 10, 11, or 12 inches of length change.

In some embodiments, beams 508/510 may be fully enclosed. In some embodiments, beams 508/510 may have one side open, such as shown in FIG. 20B.

From the foregoing description, it will be appreciated that an inventive spare tire carrier is disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A vehicle comprising:
    a bumper;
    a spare tire mount, the spare tire mount comprising a rotatable tube extending above and rotatably attached to the bumper such that the spare tire mount is configured to rotate away from the vehicle about a vertical longitudinal axis of the rotatable tube, the vertical longitudinal axis extending through the bumper, and a mounting frame attached to the rotatable tube, the mounting frame including an attachment structure defining an attachment surface, the attachment structure spaced from the vertical longitudinal axis and disposed above a vertical centerline of the bumper when the spare tire mount is in a storage position; and
    an adjustable spare tire carrier removably attached to the spare tire mount, the adjustable spare tire carrier comprising:
        a first leg having a first plurality of apertures and configured to removably attach to the attachment surface of the mounting frame; and
        a second leg connected with the first leg and having a second plurality of apertures, wherein when the adjustable spare tire carrier is attached to the spare tire mount and the spare tire mount is in the storage position, the second leg is angled inwards towards the vehicle relative to the first leg and at least a portion of the second leg extends over the mounting frame;
        each of the first leg and the second leg being defined by a rearward facing surface and a frontward facing surface, and at least one of the first leg and the second leg having a plurality of sidewalls connecting the rearward facing surface with the frontward facing surface;
        wherein the first leg and the second leg are both configured to attach to a spare tire or an extender; and
        wherein when the second leg is attached to the spare tire or the extender and the spare tire mount is in the storage position, the spare tire or the extender is angled inwards towards the vehicle relative to the first leg such that an upper portion of the spare tire that is above and furthest from the bumper is positioned closer to the vehicle than the remainder of the spare tire.

2. The vehicle of claim 1, wherein the first leg and the second leg are connected at an angle.

3. The vehicle of claim 1, further comprising the extender attached to the adjustable spare tire carrier.

4. The vehicle of claim 1, wherein the attachment surface faces rearward and the adjustable spare tire carrier is attached to the attachment surface.

5. The vehicle of claim 1, wherein the attachment surface faces forward and the adjustable spare tire carrier is attached to the attachment surface.

6. The vehicle of claim 1, wherein the adjustable spare tire carrier comprises a cutout section for conforming to a portion of the vehicle or the spare tire mount.

7. The vehicle of claim 1, wherein the rotatable tube is located on one of a right side and a left side of the bumper.

8. A vehicle comprising:
    a bumper;
    a spare tire mount, the spare tire mount comprising a rotatable tube extending above and rotatably attached to the bumper such that the spare tire mount is configured to rotate away from the vehicle about a vertical longitudinal axis of the rotatable tube, the vertical longitudinal axis extending through the bumper, and a mounting frame attached to the rotatable tube, the mounting frame defining an attachment surface, the attachment surface spaced from the vertical longitudinal axis and disposed above a vertical centerline of the bumper when the spare tire mount is in a storage position; and an adjustable spare tire carrier removably attached to the spare tire mount, the adjustable spare tire carrier comprising:

a first mounting surface configured to removably attach to the attachment surface of the mounting frame; and a second mounting surface, wherein when the adjustable spare tire carrier is attached to the spare tire mount and the spare tire mount is in the storage position, the second mounting surface extends towards the vehicle such that a portion of the second mounting surface is positioned closer to the vehicle than the attachment surface of the mounting frame is;

wherein the first mounting surface and the second mounting surface are both configured to attach to a spare tire or an extender; and wherein when the second mounting surface is attached to the spare tire or the extender and the spare tire mount is in the storage position, the spare tire or the extender is angled inwards towards the vehicle relative to the first mounting surface such that an upper portion of the spare tire that is above and furthest from the bumper is positioned closer to the vehicle than the remainder of the spare tire, thereby moving the center of gravity of the spare tire forward from where it would be if it was connected to the first mounting surface.

9. The vehicle of claim 8, wherein the first mounting surface and the second mounting surface of the adjustable spare tire carrier are connected at an angle.

10. The vehicle of claim 8, further comprising an extender attached to the adjustable spare tire carrier.

11. The vehicle of claim 8, wherein the attachment surface faces rearward and the adjustable spare tire carrier is attached to the attachment surface.

12. The vehicle of claim 8, wherein the attachment surface faces forward and the adjustable spare tire carrier is attached to the attachment surface.

13. The vehicle of claim 8, wherein the adjustable spare tire carrier comprises a cutout section for conforming to a portion of the vehicle or the spare tire mount.

14. The vehicle of claim 8, wherein the rotatable tube is located on one of a right side and a left side of the bumper.

* * * * *